(12) United States Patent
Rieger et al.

(10) Patent No.: US 11,579,592 B2
(45) Date of Patent: Feb. 14, 2023

(54) SYSTEMS AND METHODS FOR CONTROL SYSTEM SECURITY

(71) Applicant: Battelle Energy Alliance, LLC, Idaho Falls, ID (US)

(72) Inventors: Craig G. Rieger, Pocatello, ID (US); Edward E. Springer, Idaho Falls, ID (US); Michael V. McCarty, Idaho Falls, ID (US); Timothy R. McJunkin, Idaho Falls, ID (US)

(73) Assignee: BATTELLE ENERGY ALLIANCE, LLC, Idaho Falls, ID (US)

( * ) Notice: Subject to any disclaimer, the term of this patent is extended or adjusted under 35 U.S.C. 154(b) by 0 days.

(21) Appl. No.: 16/990,972

(22) Filed: Aug. 11, 2020

(65) Prior Publication Data
US 2021/0048796 A1 Feb. 18, 2021

Related U.S. Application Data

(60) Provisional application No. 62/885,520, filed on Aug. 12, 2019.

(51) Int. Cl.
*G05B 19/418* (2006.01)
*G06F 21/82* (2013.01)
(Continued)

(52) U.S. Cl.
CPC ..... *G05B 19/4183* (2013.01); *G05B 19/4184* (2013.01); *G05B 19/4185* (2013.01);
(Continued)

(58) Field of Classification Search
CPC ............ G05B 19/4183; G05B 19/4184; G05B 19/4185; G06F 21/554; G06F 21/82; G06F 21/85
See application file for complete search history.

(56) References Cited

U.S. PATENT DOCUMENTS 7,376,870 B2 5/2008 Katarina et al.
7,602,617 B2 10/2009 Brandt et al.
(Continued)

FOREIGN PATENT DOCUMENTS

WO WO2017201520 A1 11/2017

OTHER PUBLICATIONS

Mulder, John C.; Schwartz, Moses Daniel; Berg, Michael J.; Van Houten, Jonathan Roger; Urrea, Jorge Mario; King, Michael Aaron et al. WeaselBoard : zero-day exploit detection for programmable logic controllers., report, Oct. 1, 2013; Albuquerque, New Mexico. (https://digital.library.unt.edu/ark:/67531/metadc871462/: accessed Mar. 3, 2022), University of North Texas Libraries, UNT Digital Library, https://digital.library.unt.edu; crediting UNT Libraries Government Documents Department.

*Primary Examiner* — Ashokkumar B Patel
*Assistant Examiner* — William B Jones

(57) ABSTRACT

A component security device may be disposed at an interface between a component and a cyber-physical system. The disclosed component security device may be physically and/or electrically coupled between the component and infrastructure of the cyber-physical system, such as a backplane, bus, and/or the like. The component security device may be configured to monitor the component, and selectively isolate the component from the cyber-physical system. Since the component security device is interposed at the interface of the component, the component security device may be capable of isolating the component regardless of whether the component has been compromised (e.g., regardless of whether the component is capable of complying with system commands).

33 Claims, 13 Drawing Sheets

(51) Int. Cl.
*G06F 21/85* (2013.01)
*G06F 21/55* (2013.01)

(52) U.S. Cl.
CPC ............ *G06F 21/554* (2013.01); *G06F 21/82* (2013.01); *G06F 21/85* (2013.01)

(56) References Cited

U.S. PATENT DOCUMENTS

| | | |
|---|---|---|
| 8,832,348 B2 | 9/2014 | Cepulis et al. |
| 9,009,084 B2 | 4/2015 | Brandt et al. |
| 9,032,522 B1 * | 5/2015 | Mulder ................. G06F 21/552 726/23 |
| 9,412,073 B2 | 8/2016 | Brandt et al. |
| 9,696,704 B2 | 7/2017 | Xu et al. |
| 9,800,592 B2 | 10/2017 | Jain et al. |
| 2003/0105987 A1 | 6/2003 | Gilbert et al. |
| 2009/0013210 A1 | 1/2009 | McIntosh et al. |
| 2013/0145482 A1 * | 6/2013 | Ricci ..................... G06F 3/0484 726/28 |
| 2015/0058985 A1 | 2/2015 | Sanchez et al. |
| 2015/0229660 A1 | 8/2015 | Palmin |
| 2017/0177865 A1 | 6/2017 | Chowdhury |
| 2019/0296967 A1 * | 9/2019 | Yang ................... H04L 41/0893 |

* cited by examiner

SYSTEMS AND METHODS FOR CONTROL SYSTEM SECURITY

CROSS-REFERENCE TO RELATED APPLICATIONS

This application claims the benefit of U.S. Provisional Application No. 62/885,520 filed Aug. 12, 2019, which is incorporated by reference herein.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

SUMMARY

Control systems are often tasked with managing complex, potentially dangerous physical processes. Unauthorized or malicious access to a control system may have serious consequences, including damage to the physical process, harm to personnel, release of potentially dangerous materials, and so on. Many control systems, however, lack adequate security protections and, as such, may be vulnerable to cyberattack, or even inadvertent access.

A perimeter security system can be used to protect internal control-system infrastructure from unauthorized access. Although these security systems may be effective against external cyberattack, they may be unable to detect "internal attacks." Internal attacks may involve attempts to compromise vulnerable components within the internal electronic communication infrastructure of the control system. An attacker may utilize a compromised component to ignore or block control system commands, inject malicious data into the control system, or the like. Even if the security system could detect these types of attacks, it would still be incapable of adequately responding. Since compromised components often ignore commands, the security system may be unable to isolate compromised components from the control system. The compromised components may continue to disrupt control system operation until they are physically removed or disconnected from infrastructure of the control system.

Disclosed herein are systems, methods, and apparatus for control system security. Aspects of the disclosed techniques may protect control systems from internal attack. The disclosed techniques may detect and/or mitigate attacks directed against internal components of a control system (e.g., may provide component-level monitoring and/or security functionality). In some implementations, a component security device (or component-level security device) is configured to be operably and/or physically coupled to a component of a control system. The component security device may be physically coupled between the component and the control system. In some aspects, the component security device is configured to be interposed between the component and control system infrastructure, such as a backplane, bus, and/or the like. The component security device may be capable of isolating the component from the control system. Implementations of the component security device may be capable of isolating the component from control system infrastructure even if the component is compromised and/or is incapable of responding to commands.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements, as drawn, are not intended to convey any information regarding the actual shape of the particular elements and have been solely selected for ease of recognition in the drawings.

DETAILED DESCRIPTION

Figure 1A:
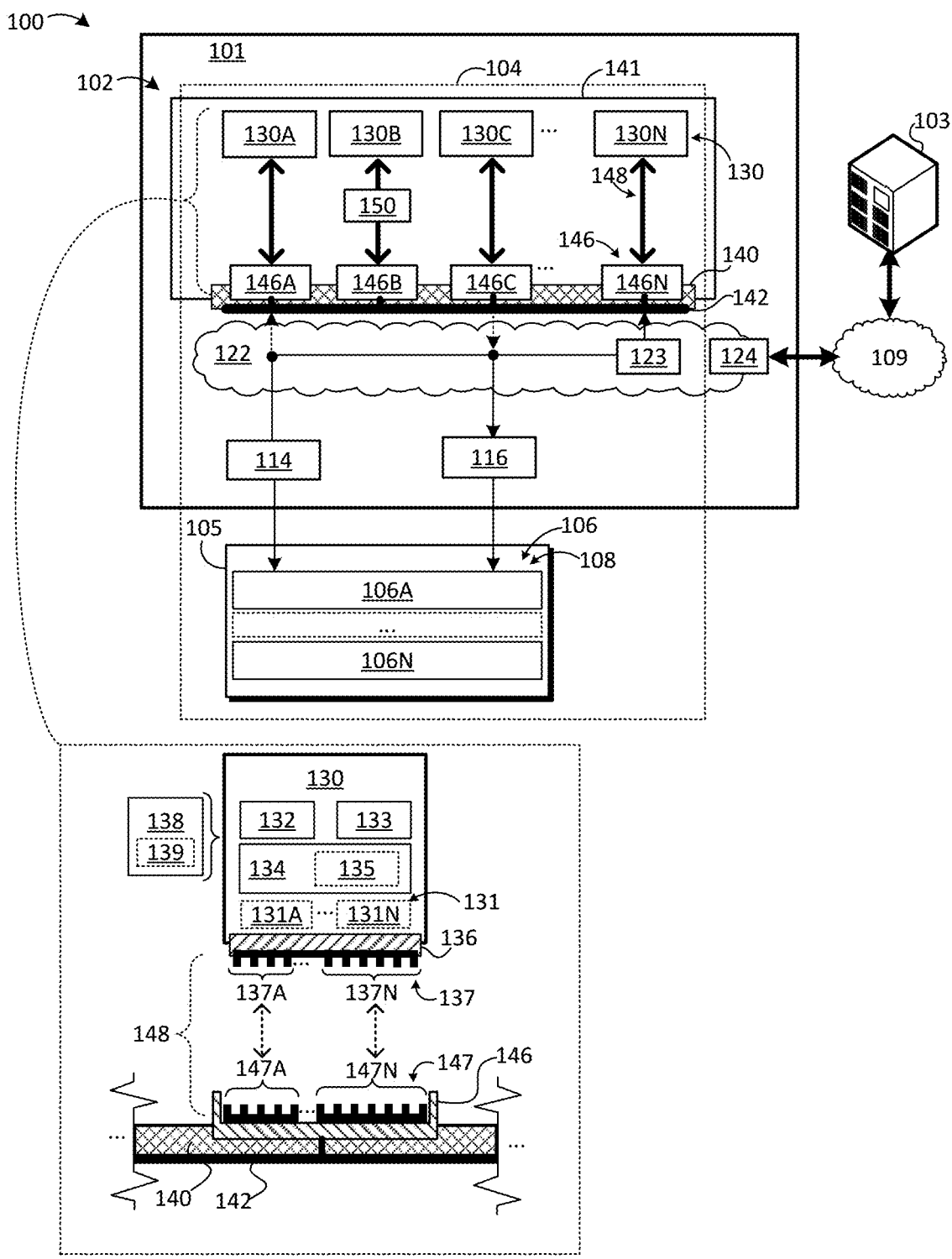
FIG. 1A illustrates an example of a system that includes a device that can implement aspects of control system security, as disclosed herein.

Cyber-physical systems can be designed to link sensing, computation, and control functionality to physical processes. Control systems are examples of cyber-physical systems. Control systems can be configured to monitor, manage, and/or otherwise control physical processes, such as industrial processes, chemical processes, manufacturing processes, fabrication processes, power generation processes, power distribution processes, and/or the like. Control systems may be tasked with managing physical processes involving potentially dangerous materials, such as hazardous chemicals, radioactive materials, or the like. Moreover, the physical processes may involve materials at high-energy states, such as high temperatures, pressures, or voltage potentials. Unauthorized or malicious access to a control system may have serious consequences, including damage to the physical process, harm to personnel, release of potentially dangerous material, and so on.

Given their interconnected nature, cyber-physical systems can be vulnerable to inadvertent access or cyberattack. As used herein, a "cyberattack" may refer to an attempt to expose, alter, disable, destroy, steal, or gain unauthorized access to, or make unauthorized use of, an asset, such as a control system (or component thereof). A perimeter security system (or simply "security system") may be designed to protect internal electronic communication infrastructure of the control system, such as a network, an internal network, a control system network, a control system local area network (LAN), and/or the like. These security systems may include, but are not limited to: a firewall, a router, a screening router, a LAN, a private network, a Virtual Private Network (VPN), a perimeter network (e.g., a Demilitarized Zone (DMZ)), a security DMZ, a proxy server, a forward proxy server, a reverse proxy server, a Software Defined Perimeter (SDP), a network security appliance, a network filter, a Unified Threat Management (UTM) appliance, an antivirus scanner, a malware scanner, an intrusion detection appliance, a content filtering device, and/or the like.

Although perimeter security systems may be effective against external cyberattack, many of these systems are incapable of detecting attacks involving internal control system components. More specifically, these systems may be incapable of detecting attacks involving internal components of the control system, such as communication components, input/output (I/O) components, control components, or the like. These types of "internal attacks" may involve attempts to compromise components of the control system. As used herein, "compromising" a component may refer to causing the component to deviate from specified functionality. An attacker may utilize a compromised component to disrupt the control system by causing the compromised component to ignore or block control system commands, inject malicious data into the control system, or the like. Since compromised components may not respond to commands, even if perimeter security systems were able to detect internal attacks, they would be incapable of responding.

Consider, for example, an internal attack to compromise an internal I/O component of a control system. The attack may cause the compromised I/O component to inject malicious sensor data into the control system. The malicious sensor data may cause other components of the system to implement invalid control actions, resulting in dangerous operating conditions or even damage. The compromised I/O component may ignore control system commands. Therefore, even if the security system detects the attack, it may be unable to prevent the compromised I/O component from disrupting the control system. The compromised I/O component may continue injecting malicious sensor data until it is physically disconnected from control system infrastructure.

Consider another example involving an internal attack directed at a control component of a cyber-physical system. The attack may modify one or more parameters of the compromised control component, such as the set point of a physical process variable or the like. The modifications may result in dangerous operating conditions within the physical process. Even if the attack is detected, the security system may be unable to reset the parameters of the compromised control component. As such, the dangerous conditions may persist until the compromised control component is manually isolated from the control system network.

Disclosed herein are techniques for control system security that enable components to be disconnected from internal control system infrastructure. In some aspects, a component security device includes a component manager configured to be deployed at a coupling between an integration device of a control system and a component of the control system. The component manager may include a first coupler configured to couple with an integration device of the control system, and a second coupler configured to couple with a component of the control system. The component security device may further include a security engine configured to isolate the component from the control system in response to detection of an anomaly pertaining to the component, wherein isolating the component includes interrupting the coupling between the integration device and the component.

Also disclosed herein are methods for control system security. Aspects of the disclosed methods may include establishing electrical connections between a component of a control system and an integration device of the control system at a component security device, the electrical connections configured to couple the component to one or more services provided by the integration device, detecting anomalous behavior of the component, and implementing one or more mitigation actions at the component security device in response to detection of the anomalous behavior, the mitigation actions including interrupting one or more of the electrical connections between the component and the integration device, the interrupting configured to disconnect the component from one or more of the services provided by the integration device.

FIG. 1A illustrates an example of a cyber-physical system 100 that includes a device that can implement aspects of control system security, as disclosed herein. The cyber-physical system 100 may include and/or implement one or more of: a control system, an industrial control system, an intelligent control system, a distributed control system, an embedded control system, a vehicle control system, a building control system, a process control system, a plant control system, a manufacturing control system, a power control system, a power grid system, a Supervisory Control and Data Acquisition (SCADA) system, and/or the like. In the FIG. 1A example, the cyber-physical system 100 implements a control system 101. The control system 101 may include a plurality of cyber-physical components (components 102), which may be operably and/or communicatively coupled to one or more physical processes 105 (and/or physical process attributes 106 thereof). As used herein, a "physical process" 105 may refer to any suitable phenomena and/or process, including, but not limited to: an industrial process, a mechanical process, an electromechanical process, an electrical process, an electrical power process, an electrical power generation process, an electrical power distribution process, an electrical power conditioning process, an electrical power storage process, an electrical power load process, a manufacturing process, a fluid process, a chemical process, and/or the like.

The control system 101 may include, embody, and/or be configured to implement one or more cyber-physical control elements 104. As used herein, a "cyber-physical control element" (CPCE) 104 refers to a control function pertaining to a physical process 105. A CPCE 104 may be implemented by components 102 of the control system 101. Implementing a CPCE 104 may include sensing, measuring, monitoring, adjusting, manipulating, managing, regulating, protecting, and/or otherwise controlling one or more physical process variables 108. As used herein a "physical process variable" (PPV) 108 may refer to any suitable characteristic of a physical process 105, such as one or more physical process attributes 106A-N, as illustrated in FIG. 1A. Implementing a CPCE 104 may include implementing one or more control functions, control loops, control algorithms, and/or the like.

The control system 101 may include cyber and/or computational components 102, which may be operably and/or communicatively coupled to PPV 108 (e.g., a physical process 105 and/or one or more physical process attributes 106 thereof). The computational components 102 may be coupled to PPV 108 by other, physical components 102 of the control system 101, which may include, but are not limited to: field devices, acquisition devices 114 (e.g., sensor devices, monitoring devices, and/or the like), actuation devices 116 (e.g., control units, motor control units, and/or the like), and so on.

As used herein, an acquisition device 114 may include any suitable device for obtaining information pertaining to a PPV 108 (and/or components 102 of the control system 101). An acquisition device 114 may include, but is not limited to: a monitor device, a sensor, a sensor device, a SCADA sensor, an active sensor, a passive sensor, a measurement device, a monitoring device, an electromechanical sensor device, an electrical measurement device, a current measurement device, a voltage measurement device, a capacitance measurement device, an inductive sensor, a resistance measurement device, an impedance measurement device, a phase measurement unit (PMU), a magnetic sensor, a magnetic field sensor, an Anisotropic Magneto-Resistive (AMR) sensor, an arc detection device, a Hall effect sensor, a power measurement device, an electrical power measurement device (e.g., a power meter), a light sensor, a color sensor, a photoelectric sensor, an electro-optical radiation sensor, an infrared sensor, an image capture device, a mechanical measurement device, a mechanical power measurement device, a torque sensor, a tachometer, a position sensor, a Global Navigation Satellite System (GNSS) device (e.g., a device configured to receive Global Positioning System (GPS) signals, GLONASS signals, Galileo signals, or the like), a velocity measurement device, a vehicle speed sensor, a speedometer, an angular velocity sensor, an orientation sensor, a tile sensor, a compass, an accelerometer, a gyroscope, a pressure sensor, a shock sensor, a vibration sensor, an ultrasonic sensor, a temperature sensor, a thermocouple device, a humidity sensor, a proximity sensor, a chemical sensor, a particulate sensor, a gas sensor, a smoke sensor, a flow sensor, a level sensor, a touch sensor, a nanosensor, and/or the like.

As used herein, an actuation device 116 may include any suitable device for actuating, implementing, monitoring, controlling, and/or otherwise managing physical operations pertaining to a PPV 108 (and/or one or more components 102 of the control system 101). An actuation device 116 may include, but is not limited to, one or more of: a SCADA actuator, a linear actuator, a rotary actuator, a fluid actuator, a hydraulic actuator, a hydraulic cylinder actuator, a pneumatic actuator, a mechanical actuator, a rack and pinion actuator, a comb drive actuator, a chain actuator, a screw jack actuator, a magnetic actuator, an electric actuator, an electromechanical actuator, a motor control unit, an electric motor, an electric motor controller, a power controller, a voltage controller, a current controller, a servomechanism, a solenoid, a stepper motor, a torque motor, a shape-memory allow actuator, a switch, a rotary switch, a toggle switch, an electronic switch, an electrically operated switch, a relay, a solid-state relay, an analog switch, a crossbar switch, a transistor switch, an electromechanical relay, an attracted armature relay, an induction relay, a mechanical relay, a moving coil relay, a motor-operated relay, a thermal relay, a circuit breaker, a Twisted and Coiled Polymer actuator, a Supercoiled Polymer (SCP) actuator, a thermal actuator, a thermal bimorph actuator, a soft actuator, a Shape Memory Polymer (SMP) actuator, a Photopolymer/Light Activated Polymer (LAP) actuator, a Dielectric Elastomer (DE) actuator, an Ionic Polymer Metal Composite (IPMC) actuator, an Electroactive Polymer (EAP) actuator, and/or the like. In some implementations, an actuation device 116 may be configured to acquire state information pertaining to one or more PPV 108 (a physical process 105 and/or attribute(s) 106 thereof), the actuation device 116 itself, physical operations implemented by the actuation device 116, and/or the like. The actuation device 116 may be further configured to communicate acquired state information within the control system 101. Alternatively, or in addition, the actuation device 116 may include and/or be coupled to one or more acquisition devices 114, which may be configured to acquire and/or communicate state information within the control system 101, as disclosed herein.

The cyber-physical system 100 may include a cyber-physical system (CPS) network 122. As used herein, a CPS network 122 may include and/or refer to any suitable infrastructure for enabling electronic communication between components 102 of a cyber-physical system 100, such as a control system 101, including, but not limited to: a communication network, an electronic communication network, an internal network, an Internet Protocol (IP) network, a wireless network, a Local Area Network (LAN), a Wide Area Network (WAN), a Virtual Private Network (VPN), a wireless network (e.g., IEEE 802.11a-n wireless network, Bluetooth® network, Near-Field Communication (NFC) network, and/or the like), a public switched telephone network (PSTN), a mobile network (e.g., a network configured to implement one or more technical standards or communication methods for mobile data communication, such as Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), High Speed Uplink Packet Access (HSUPA), Long Term Evolution (LTE), LTE-A (Long Term Evolution-Advanced), and/or the like), an embedded network, a control network, a process control network, a sensor network, an actuator network, a SCADA network, a Distributed Network Protocol (DNP3) network, an International Electrotechnical Commission 60870 (IEC 60870) network, an Experimental Physics and Industrial Control System (EPICS), a combination of networks, a Phasor network, a plurality of networks, a plurality of separate networks, a plurality of communicatively and/or operatively coupled networks, and/or the like.

In some examples, the CPS network 122 may include an internal and/or private network. The control system 101 may include cyber security components 123 configured to secure the CPS network 122. Securing the CPS network 122 may include encrypting, signing, authenticating, and/or verifying the integrity of components 102 coupled to the CPS network 122 and/or information communicated thereon. As used herein, information communicated on a CPS network 122 may be referred to as a message, packet, and/or the like, and may include one or more of: data, electronic data, signals, control signals, control system signals, commands, sensor data, sensor signals, sensor commands, actuator data, actuator signals, actuator commands, synchrophasors, synchrophasor data, network data, network address data, network protocol data, packet data (e.g., an IP packet, a DNP3 packet, a SCADA packet, and/or the like), network security data (e.g., authentication data, signature data, and/or the like), network integrity data, and/or the like. The cyber security components 123 may be configured to detect anomalous conditions within the CPS network 122 (e.g., may include a network monitor, network anomaly sensor, intrusion detector, and/or the like).

In some implementations, the cyber-physical system 100 further includes one or more perimeter security components 124 configured to securely couple the CPS network 122 (and/or portions thereof) to one or more other networks, such as an external network 109 (a LAN, a WAN, a VLAN, the Internet, and/or the like). The perimeter security components 124 may be configured to prevent, detect, and/or mitigate attacks originating from outside of the CPS network 122 (e.g., from an external network 109). The perimeter security components 124 may include, but are not limited to: a gateway, a secure channel, a firewall, a port monitor, a network filter, an intrusion detection system, and/or the like.

The control system 101 may further include one or more intelligent control system components 130. As used herein, an "intelligent control system component" (ICSC) 130 refers to a control system component that includes computing capabilities and/or resources, such as processing, memory, and/or data storage resources. An ICSC 130 may refer to a microprocessor-based component or device, such as a computing device, an intelligent electronic device (IED), an electronic communication device, a network communication device, an input/output (I/O) device, a controller, a process controller, a microcontroller, control logic, programmable logic, a programmable logic controller (PLC), a relay, a protective relay, a safety relay, a switch, an automation controller, a Real-Time Automation Controller (RTAC), a human-machine interface (HMI) device, a supervisory computing device, a Remote Terminal Unit (RTU), and/or the like.

An ICSC 130 may be supported by cyber infrastructure components, such as a component integration device 140. As used herein, a "component integration device" (CID) 140 refers to any suitable device for enabling and/or supporting operation of a component 102 within a control system 101, which may include coupling the component 102 to one or more services, which may include, but are not limited to: power supply services, communication services, and/or the like. In the FIG. 1A example, the CID 140 is configured to support operation of one or more ICSC 130 (e.g., ICSC 130A-N). The CID 140 may be configured to operably couple one or more of the ICSC 130A-N to the control system 101. The CID 140 may include any suitable component support, integration, and/or aggregation infrastructure, including, but not limited to: a power supply, a power source, a power adapter, a power converter, a power conditioner, a bus power supply, a power management bus (PM-Bus), a backplane power supply, a backplane, a backplane controller, a backplane arbiter, a backplane bus, a backplane bus controller, a backplane bus arbiter, a PLC backplane, a bus, a bus controller, a bus arbiter, a control bus, a system bus, a control system bus, a communication bus, a peripheral bus, a serial bus, a parallel bus, a Universal Serial Bus (USB) bus, an IEEE 1394 bus, a Fieldbus, an Industry Standard Architecture (ISA) bus, a High Performance Parallel Interface (HIPPI) bus, a Peripheral Component Interconnect (PCI) bus, an IEEE-488 bus, a Scalable Coherent Interface (SCI) bus, a Small Computer System Interface (SCSI) bus, a Versa Module Europa (VME) bus, a VME eXtensions for Instrumentation (VXI) bus, an RS-232 bus, an RS-485 bus, a Controller Area Network (CAN) bus, a fabric, a communication fabric, a switched fabric, a proprietary integration device, a proprietary backplane, a proprietary bus, and/or the like. In some examples, the CID 140 may include, embody, and/or be coupled to a CID network 142. The CID network 142 may include any suitable communication infrastructure as disclosed herein, including, but not limited to: an electronic communication network, a bus, a peripheral bus, a communication bus, a backplane, a backplane bus, a Transmission Control Protocol (TCP) network, an IP network, a TCP/IP network, an Ethernet network, an Industrial Ethernet network, an Attached Resource Computer NETwork (ARCNET), a Common Industrial Protocol (CIP) network, a CAN bus network, a DeviceNet network, a local operating network (LonWorks), a Modbus network, a Modbus RTU network, a Fieldbus network, a Process Field Net (PROFINET) network, a proprietary network, and/or the like. In the FIG. 1A example, the CID 140 may include and/or be disposed within a support structure 141, such as a chassis, an enclosure, a panel, a rack, a case, a frame, and/or the like.

The CID 140 may include elements to physically and/or electrically couple components 102 thereto). As illustrated in FIG. 1A, the CID 140 may include one or more infrastructure couplers (IC) 146, each configured for coupling a respective control system component 102 to the CID 140 and/or service(s) provided thereby (e.g., IC 146A-N). An IC 146 may be configured to establish a component integration coupling 148 with an ICSC 130. As used herein, a "component integration coupling" (CIC) 148 refers to any suitable mechanism for coupling a component 102, such as an ICSC 130 to one or more services, including, but not limited to: a physical connection, an electrical connection, an electromagnetic connection, and/or the like. An IC 146 may include any suitable mechanism for establishing, maintaining, securing, and/or managing a CIC 148, including, but not limited to: one or more connectors, electrical connectors, electrical contacts, vias, via connectors, risers, riser connectors, pads, pad connectors, pins, pin connectors, pinouts, pinout connectors, device packaging, device packaging connectors, device interfaces, device interface connectors, substrate connectors, substrate-to-substrate connectors, chip connectors, chip-to-chip connectors, board connectors, board-to-board connectors, printed circuit board (PCB) connectors, PCB-to-PCB connectors, surface mounts, surface mount connectors, PCB mount connectors, inline connectors, cable connectors, chassis connectors, panel connectors, splice connectors, butt connectors, wire-to-wire connectors, gendered connectors, male-female connectors, pin and socket connectors, ball grid array (BGA) connectors, parallel connectors, serial connectors, ports, port connectors, slots, slot connectors, sockets, socket connectors, optical fiber connectors, edge connectors, power connectors, backplane connectors, bus connectors, physical connectors, latches, clips, bolts, screws, pins, support structures, and/or the like.

FIG. 1A illustrates an example of an ICSC 130 coupled to a CID 140, as disclosed herein. The ICSC 130 may include computing resources such as processing resources 132 and memory resources (memory 133). The processing resources 132 may include any suitable processing resource, including, but not limited to: circuitry, logic circuitry, an integrated circuit, an application-specific integrated circuit (ASIC), a processor, a central processing unit (CPU), a general purpose processor, a special-purpose processor, an embedded processor, programmable logic, a Field Programmable Gate Array (FPGA), a controller, a PLC, a microcontroller, a system on a chip (SoC), and/or the like. The memory 133 may include any suitable computer-readable memory, including, but not limited to: volatile memory, random access memory (RAM), static RAM (SRAM), dynamic RAM (DRAM), non-volatile memory, battery-backed RAM, and/or the like. In some implementations, an ICSC 130 may further include persistent storage 134, such as non-volatile storage, non-transitory storage, a non-transitory storage device, a non-transitory storage medium, a solid-state storage device, a solid-state storage medium, Flash memory, an electrically erasable programmable read-only memory (EEPROM), and/or the like. The persistent storage 134 may include ICSC data 135, such as firmware, configuration data, computer-readable instructions, and/or the like. In some aspects, an ICSC 130 may include and/or embody one or more functional modules 138. A functional module 138 may be embodied by processing resources 132 of the ICSC 130 (e.g., by circuitry, logic circuitry, programmable logic, and/or the like). Alternatively, or in addition, a functional module 138 may be embodied by computer-readable instructions maintained within non-transitory storage (e.g., persistent storage 134 of the ICSC 130), the instructions adapted to configure the ICSC 130 to implement operations pertaining to the functional module 138. A functional module 138 may be configured to implement functionality of a CPCE 104 of the control system 101 in accordance with a functional module (FM) configuration 139 thereof, which functionality may include, but is not limited to: I/O functionality, input functionality, output functionality, computational functionality, control functionality (e.g., one or more control functions), communication functionality, and/or the like. In some implementations, the FM configuration 139 of an ICSC 130 may be maintained within non-transitory storage, such as persistent storage 134 of the ICSC 130 (e.g., the ICSC data 135 may include FM configuration(s) 139 of one or more functional modules 138 implemented by the ICSC 130).

The ICSC 130 may further include one or more external interfaces. In the FIG. 1A example, the ICSC 130 includes a component coupler (CC) 136, which may be configured to couple the ICSC 130 to a component integration device, such as a backplane, bus, and/or the like. The CC 136 may be configured to couple the ICSC 130 to the CID 140, which may include the CC 136 establishing a CIC 148 with an IC 146 of the CID 140.

An IC 146 of the CID 140 may include any suitable mechanism for establishing a CIC 148, as disclosed herein. The IC 146 illustrated in FIG. 1A includes one or more IC connectors 147, each configured to establish a respective electrical and/or physical connection of a CIC 148. The IC connectors 147 may include connector groups corresponding to respective services of the CID 140, such as power supply services, communication services (e.g., the CID network 142 or the CPS network 122), and/or the like. The IC connectors 147 may include IC power connectors 147A, IC communication connectors 147N, and so on. The IC power connectors 147A may be configured to couple an ICSC 130 to power supplied by and/or through the CID 140. The IC power connectors 147A may be configured to couple an ICSC 130 to power supplied in accordance with respective power supply specifications (e.g., power supplied at specified voltages, current levels, wattages, in accordance specified pinouts, and/or the like). In some examples, the IC power connectors 147A may be configured to couple an ICSC 130 to a plurality of different power supply services (through different groups and/or sets of IC power connectors 147A), each corresponding to a respective power supply specification and/or configured to power respective functionality of the ICSC 130 (e.g., power respective functional module(s) 138 of the ICSC 130). The IC communication connectors 147N may be configured to couple an ICSC 130 to communication services provided by and/or through the CID 140. The communication services may be configured to couple the ICSC 130 to electronic communication infrastructure of the control system 101, which may include implementing and/or supporting electronic communication to and/or from the ICSC 130 (e.g., implementing one or more Open Systems Interconnection (OSI) model layers, such as a physical layer, data link layer, network, transport layer, and/or the like). The IC communication connectors 147N may be configured to couple the ICSC 130 to communication service(s) in accordance with a particular OSI model layer, specification, protocol, pinout, and/or the like.

The IC communication connectors 147N may be configured to couple the ICSC 130 to the CID network 142, as disclosed herein. The CID 140 may be further configured to couple the CID network 142 (and/or ICSC 130 coupled thereto) to one or more other electronic communication networks. The CID 140 may implement and/or support addressing, switching, routing, gateway, and/or other network communication services pertaining to the other electronic communication networks, which may include, but are not limited to: the CPS network 122, an external network 109 (through one or more cyber security component(s) 123 and/or perimeter security component(s) 124), a device network (e.g., an acquisition device network, a sensor device network, an actuation device network, and/or the like), a proprietary network, one or more communication channels (e.g., channels on one or more electronic communication networks), component-to-component communication channels, communication tunnels, secure communication tunnels, and/or the like. The communication services provided through the IC communication connectors 147N may be configured to support communication interface(s) 131 of the ICSC 130, which may include, but are not limited to: a CID network interface (a backplane interface, bus interface, and/or the like), a CPS network interface, an external network interface, a device network interface, an incoming communication interface (e.g., route incoming network traffic to the ICSC 130), an outgoing communication interface (e.g., route outgoing network traffic originating from the ICSC 130), a downstream communication interface (e.g., route network traffic pertaining to the ICSC 130 to and/or from one or more downstream components 102, as disclosed herein), an upstream communication interface (e.g., route network traffic pertaining to the ICSC 130 to and/or from one or more upstream components 102, as disclosed herein), and/or the like. In some implementations, the IC communication connectors 147N may be configured to couple the ICSC 130 to a plurality different of communication services (through different groups and/or sets of IC communication connectors 147N), each corresponding to a respective communication service (e.g., a respective electronic communication network, communication interface 131, and/or the like).

As illustrated in FIG. 1A, the CC 136 of the ICSC 130 may be configured to couple the ICSC 130 to the CID 140 (e.g., establish a CIC 148 with an IC 146 of the CID 140). Alternatively, or in addition, the CC 136 may be configured to establish the CIC 148 through and/or by use of one or more intermediary devices (e.g., one or more interposer components, not shown in FIG. 1A to avoid obscuring details of the illustrated examples). In some implementations, the ICSC 130 may be coupled to the CID 140 by and/or through a component security device 150, as disclosed in further detail herein (e.g., the component security device 150 may be interposed between the ICSC 130B and the IC 146B of the CID 140, as illustrated in FIG. 1A).

The CC 136 may include one or more CC connectors 137, which may be configured to couple with the IC connectors 147 of the IC 146, as disclosed herein. The CC connectors 137 may include connector groups corresponding to respective service(s) provided by and/or through the CID 140. The CC connectors 137 may include CC power connectors 137A configured to couple the ICSC 130 to power supply services (through respective IC power connectors 147A of the IC 146), may include CC communication connectors 137N configured to couple the ICSC 130 to communication services (through respective IC communication connectors 147N of the IC 146), and so on. The CC 136 may, therefore, be configured to establish a CIC 148 between the ICSC 130 and the CID 140, which may enable the ICSC 130 to operate within the control system 101. More specifically, the CIC 148 may couple the ICSC 130 to the cyber-physical system 100.

As disclosed above, the control system 101 may include, embody, and/or be configured to implement one or more CPCE 104. Implementing a CPCE 104 may include sensing, measuring, monitoring, adjusting, manipulating, managing, regulating, protecting, and/or otherwise controlling a PPV 108 (e.g., a physical process 105 and/or physical process attribute(s) 106 thereof). Implementing a CPCE 104 may include: determining a state of the PPV 108, determining control decisions pertaining to the PPV 108 based on, inter alia, the determined state of the PPV 108, and implementing the control decisions. The control decisions may be determined by computational components 102 of the control system 101 (e.g., a control component 102). The controller may determine the state of the PPV 108 by use of data obtained by one or more acquisition devices 114 (e.g., sensors operably coupled to the physical process 105). Data indicating the state of the PPV 108 may be retrieved, processed, and/or otherwise provided to the controller by one or more I/O components 102 coupled to the acquisition devices 114. The control decisions determined by the control component 102 may be realized and/or otherwise implemented by one or more actuation devices 116. The control decisions may be processed, communicated, and/or otherwise realized by I/O components 102 coupled to the actuation devices 116. In some examples, the CPCE 104 may include a proportional-integral-derivative (PID) control function, and implementing the CPCE 104 may include: acquiring the state of the PPV 108, calculating an error value e(t) quantifying deviation between the acquired state of the PPV 108 and a target state, and determining proportional, integral, and/or derivative components of a control output u(t) to minimize the error value e(t) over time (the control output u(t) corresponding to physical control operations pertaining to the physical process 105). Alternatively, or in addition, the CPCE 104 may include a protective function, and implementing the CPCE 104 may include: monitoring a state of the PPV 108, determining whether to take one or more protective actions in accordance with the monitored state, and implementing the determined protective actions (if any). Although particular examples of control functions of a CPCE 104 are described herein, the disclosure is not limited in this regard and could be adapted for use with any suitable monitoring and/or control element configured to implement any suitable control, protection, regulation, monitoring, and/or management operations pertaining to any suitable physical process 105, physical process attribute 106, and/or PPV 108.

In some implementations, the CPCE 104 further includes HMI components, which may be embodied in one or more computing device(s), such as a terminal 103. The terminal 103 may be implemented by any suitable HMI components, including, but not limited to: input devices (e.g., keyboard, mouse, touch input device, and/or the like), output devices (e.g., a display, monitor, audio output device, haptic feedback device, and/or the like), and so on. The terminal 103 may be implemented by a computing device having processing, memory, and/or storage resources (not shown in FIG. 1A to avoid obscuring aspects of the illustrated examples). The terminal 103 may include a mobile computing device, such as a smart phone, tablet, personal digital assistant (PDA), and/or the like. The terminal 103 may be communicatively coupled to one or more components 102 of the control system 101. In some aspects, the terminal 103 may be communicatively coupled to the CPS network 122 through an external network 109 (e.g., through a perimeter security component 124, such as a gateway or the like, as disclosed herein). Alternatively, or in addition, the terminal 103 may be directly coupled to the CPS network 122 (e.g., may include and/or be communicatively coupled to an internal node of the CPS network 122). The terminal 103 may be configured to enable an entity, such as an operator (user) to monitor, configure, and/or otherwise manage the control system 101 and/or CPCE 104 thereof. The terminal 103 may include and/or be coupled to devices for monitoring, configuring, and/or otherwise managing cyber-physical components 102, such as one or more ICSC 130 (e.g., circuitry, logic, computer-readable instructions stored within non-transitory storage, and/or the like).

A CPCE 104 may be implemented by components 102 of the control system 101, as disclosed herein. The components 102 of a CPCE 104 may be logically organized into a hierarchy, including: high-level infrastructure, cyber infrastructure, and low-level infrastructure. The high-level infrastructure may include upper-level monitoring, configuration, and/or control components, such as the terminal 103, RTUs, supervisory computing devices, HMI components, and/or the like. The cyber infrastructure may include the CPS network 122, cyber security components 123, perimeter security components 124, the CID 140, the CID network 142, ICSC 130 (e.g., ICSC 130A-N), and/or the like. The low-level infrastructure may include physical components 102, such as acquisition devices 114, actuation devices 116, and/or the like.

In the FIG. 1A example, the cyber infrastructure of the CPCE 104 may include one or more ICSC 130A-N (and/or functional modules 138 thereof). The ICSC 130A may implement and/or embody a functional module 138 configured to implement input functionality of the CPCE 104 (e.g., may act as an input module of the CPCE 104), the ICSC 130B may implement and/or embody a functional module 138 configured to implement control function(s) of the CPCE 104 (e.g., may act as a control module of the CPCE 104), the ICSC 130C may implement and/or embody a functional module 138 configured to implement output functionality of the CPCE 104 (e.g., may act as an output module of the CPCE 104), and so on, with the ICSC 130N being configured to implement and/or manage communication functionality of the CPCE 104.

To implement input functionality of the CPCE 104, the ICSC 130A may be configured to acquire data pertaining to the state of the PPV 108 (state data) and communicate the acquired state data to control functionality of the CPCE 104 (e.g., ICSC 130B). The ICSC 130A may be configured to interface with an acquisition device 114 and configure the acquisition device 114 to obtain suitable state data. As used herein, "suitable state data" refers to data involved in implementation of the CPCE 104 (e.g., data pertaining to a PPV 108, physical process 105, physical process attribute 106, and/or otherwise involved in implementation of the CPCE 104). Suitable state data may refer to data captured, measured, and/or otherwise acquired in accordance with a determined acquisition scheme (e.g., data of a specified type acquired at a specified acquisition interval, frequency, resolution, and/or the like). The ICSC 130A may be configured to acquire state data and/or communicate the acquired state data to the control functionality (e.g., ICSC 130B) by use of, inter alia, communication services of the CID 140, as disclosed herein. The ICSC 130A may be configured to interface with the acquisition device 114 through the CPS network 122, device network (e.g., sensor network), device-to-device connection, an analog connection, and/or the like. The ICSC 130A may be further configured to communicate acquired state data to the control functionality (e.g., ICSC 130B) through the CID network 142 (e.g., on a backplane, bus, and/or other communication infrastructure of the CID 140). Implementing the input functionality may further include the ICSC 130A processing data obtained from the acquisition device 114 (e.g., converting, filtering, cleaning, interpreting, aggregating, validating, and/or otherwise processing data captured by the acquisition device 114). The input functionality may be embodied by hardware components of the ICSC 130A, such as an acquisition device interface (e.g., an interface configured to operatively and/or communicatively couple the ICSC 130A to the acquisition device 114); conversion circuitry, such as digital-to-analog conversion (DAC) circuitry, analog-to-digital conversion (ADC) circuitry, and/or the like; I/O circuitry; sense circuitry; signal amplifier circuitry; buffer circuitry; and/or the like. Portions of the input functionality may be implemented by a functional module 138 of the ICSC 130A in accordance with an FM configuration 139, as disclosed herein (e.g., an input configuration). The FM configuration 139 of the input module (ICSC 130A) may include information pertaining to the input functionality implemented thereby, including, but not limited to: information pertaining to data acquisition sources (e.g., information pertaining to acquisition device(s) 114 from which to acquire suitable state data), data acquisition parameters (e.g., specify acquisition schemes for particular types of state data and/or state data captured by particular acquisition devices 114), define processing operations to perform on acquired state data, indicate destination(s) for acquired state data (e.g., configure the ICSC 130A to transmit acquired state data to the ICSC 130B), and/or the like.

To implement control functionality of the CPCE 104, the ICSC 130B may be configured to determine the state of the PPV 108 based on, inter alia, acquired state data pertaining to the PPV 108 (e.g., from input functionality of the CPCE 104, such as the ICSC 130A) and determine control decisions pertaining to the PPV 108 in accordance with one or more control function(s). The ICSC 130B may be configured to receive state data from input functionality of the CPCE 104 (e.g., ICSC 130A) and/or communicate control decisions determined thereby to output functionality of the CPCE 104 (e.g., ICSC 130C) by use of, inter alia, communication services of the CID 140, as disclosed herein. The ICSC 130B may be configured to interface with ICSC 130A and/or 130C through the CID network 142, as disclosed herein (e.g., through a backplane, bus, and/or other communication infrastructure of the CID 140). The control functionality may be embodied by a functional module 138 of the ICSC 130B, which may be configured to implement control function(s) of the CPCE 104 in accordance with an FM configuration 139, as disclosed herein (e.g., a control configuration). The FM configuration 139 of the ICSC 130B may include any suitable information pertaining to the control functionality implemented thereby, including, but not limited to: I/O modules of the CPCE 104 (e.g., configure the ICSC 130B to retrieve state data from the ICSC 130A and/or output control decisions to the ICSC 130C), the control function(s) implemented thereby, settings of the control functions (e.g., a target state of the physical process 105 and/or one or more physical process attributes 106, a set point of one or more PPV 108, and/or the like), parameters of the control functions (e.g., PID parameters, such as proportional band/gain, integral gain/reset, derivative gain/rate, and/or the like), tuning parameters of the control functions, and/or the like.

To implement output functionality of the CPCE 104, the ICSC 130C may be configured to realize control decisions determined by the control functionality of the CPCE 104 (e.g., control decisions determined by the ICSC 130B). The ICSC 130C may be configured to receive control decisions determined by control functionality of the CPCE 104 (e.g., ICSC 130B), and implement the determined control decisions by use of an actuation device 116. The ICSC 130C may be configured to receive control decisions from control functionality of the CPCE 104 (e.g., ICSC 130B) and/or communicate actuation commands corresponding to the control decisions to the actuation device 116 by use of, inter alia, communication services of the CID 140, as disclosed herein. The ICSC 130C may be communicatively coupled to the control functionality (e.g., ICSC 130B) through the CID network 142, as disclosed herein. The ICSC 130C may be configured to interface with the actuation device 116 through the CPS network 122, a device network (e.g., actuator network), a device-to-device connection, an analog connection, and/or the like. The output functionality may be embodied by hardware components of the ICSC 130C, such as an actuation device interface (e.g., an interface configured to operatively and/or communicatively couple the ICSC 130C to the actuation device 116), I/O circuitry, conversion circuitry (e.g., DAC, ADC, and/or the like), signal driver circuitry, signal amplifier circuitry, buffer circuitry, and/or the like. Portions of the output functionality may be embodied by a functional module 138 of the ICSC 130C, which may be configured to implement control decisions in accordance with an FM configuration 139, as disclosed herein (e.g., an output configuration). The FM configuration 139 of the ICSC 130C may include any suitable information pertaining to the output functionality implemented thereby, including, but not limited to: source(s) of control decisions pertaining to the PPV 108 (e.g., configure the ICSC 130C to implement control decisions determined by the ICSC 130B), components 102 by which the control decisions are to be implemented (e.g., information pertaining to actuation device(s) 116 to realize the control decisions), actuation parameters (e.g., control sensitivity, response parameters, actuation range, and/or other parameters pertaining to operation of respective actuation devices 116), and/or the like.

The ICSC 130N may be configured to implement communication functionality of the CPCE 104. Implementing the communication functionality may include managing communication between components 102 of the CPCE 104, such as the ICSC 130A-C. The ICSC 130N may be configured to manage communication on the CID network 142 (e.g., on a backplane, a bus, a peripheral bus, a communication bus, and/or the like, as disclosed herein). The ICSC 130N may be configured to selectively couple ICSC 130 to the CID network 142 and/or manage communication between respective ICSC 130. The ICSC 130N may include and/or correspond to one or more components of the CID 140, such as a backplane controller, backplane arbiter, bus controller, bus arbiter, gateway, router, switch, and/or the like. The ICSC 130N may be further configured to couple the CID 140 and/or respective ICSC 130 to one or more other electronic communication networks, as disclosed herein. The ICSC 130N may, therefore, be configured to implement and/or support communication interface(s) 131 of respective ICSC 130.

In the FIG. 1A example, the ICSC 130N is configured to couple I/O functionality of the CPCE 104 (ICSC 130A and/or 130C) to one or more downstream communication channels. As used herein, a "downstream" communication channel and/or interface refers to communication between a higher-level component 102 and a lower-level component 102 (per a hierarchical organization of the cyber-physical system 100, as disclosed above). The ICSC 130N may be configured to establish downstream communication channels (downstream interfaces) coupling components 102 within the cyber infrastructure to components 102 within the lower-level infrastructure. The ICSC 130N may be configured to couple input functionality of the CPCE 104 (e.g., ICSC 130A) to the acquisition device 114 through, inter alia, a first downstream channel (a downstream interface 131 of the ICSC 130A) and couple output functionality of the CPCE 104 (e.g., ICSC 130C) to the actuation device 116 through, inter alia, a second downstream channel (a downstream interface 131 of the ICSC 130C). The first downstream channel may be configured to allow incoming network traffic to flow to the ICSC 130A from the acquisition device 114. The second downstream channel may be configured to allow outgoing network traffic to flow from the ICSC 130C to the actuation device 116. In some implementations, the first and/or second downstream channels may be established within the CPS network 122. Alternatively, or in addition, an ICSC 130 (and/or CID 140) may be coupled to a downstream channel through another mechanism, such as a device-to-device connection, a dedicated connection, an analog connection, a device network, a sensor network, an actuator network, a proprietary connection, and/or the like.

To implement communication functionality of the CPCE 104, the ICSC 130N may be further configured to communicatively couple selected ICSC 130 to the CID network 142 (e.g., establish communication channels between one or more ICSC 130A-N). The ICSC 130N may be configured to couple input functionality of the CPCE 104 (e.g., ICSC 130A) to control functionality of the CPCE 104 (e.g., ICSC 130B), couple the control functionality to output functionality of the CPCE 104 (e.g., ICSC 130C), and so on. The ICSC 130N may couple the ICSC 130 through the CID network 142. The ICSC 130N may configure the ICSC 130A to communicate acquired state data to the ICSC 130B through a first CID channel (e.g., a first backplane channel), may configure the ICSC 130B to communicate control decisions to the ICSC 130C through a second CID channel, and so on. Implementing the communication functionality may further include establishing one or more upstream communication channels, which may include communicatively coupling one or more ICSC 130 to higher-level components 102 of the control system 101, such as the terminal 103 (per the hierarchical organization of the cyber-physical system 100, as disclosed herein). The ICSC 130N may be configured to manage upstream communication through the CPS network 122 and/or one or more external networks 109 (through one or more cyber security components 123, perimeter security components 124, and/or the like).

As disclosed herein, implementing a CPCE 104 may involve a number of complex, inter-related, and potentially dangerous operations. Moreover, the physical process 105 controlled by the CPCE 104 may involve potentially hazardous materials and conditions (e.g., chemicals, radioactive materials, high temperatures, and/or the like). Unauthorized or malicious access to the control system 101 and/or control system components 102 may have serious consequences, including damage (e.g., to control system components 102 and/or the physical process 105), harm to personnel, release of potentially dangerous materials, and so on. Even if the control system 101 includes and/or is coupled to security devices capable of detecting and/or preventing certain types of cyberattacks (e.g., cyber security components 123, perimeter security components 124, and/or the like), these may be incapable of responding to component-level security threats, such as attacks directed against individual components 102. The security components 123 and/or 124 may be capable of detecting anomalous network behavior, such as changes in traffic patterns within with the CPS network 122, but may be incapable of accurately determining information pertaining to the source and/or target of the anomalous behavior. Moreover, even if the security components 123 and/or 124 are capable of determining that a component 102 (e.g., an ICSC 130) has been compromised, the security components 123 and/or 124 may be incapable of adequately responding. Conventional security systems may be incapable of quickly isolating compromised components 102 from the cyber-physical system 100, leading to increased risk of adverse consequences from such attacks.

By way of non-limiting example, a cyberattack may be directed against individual components 102 of the control system 101 (either through the internal CPS network 122, an external network 109, or the like). The cyberattack may result in disrupting operation of an ICSC 130 (compromising the ICSC 130). The compromised ICSC 130 may inject malicious control system data into the cyber-physical system 100, which may disrupt operation of the control system 101 and one or more CPCE 104, and lead to dangerous situations with potentially serious consequences. As used herein, "control system data" refers to data pertaining to the implementation, monitoring, and/or management of a control system 101 and/or a CPCE 104 thereof. Control system data may include, but is not limited to: data acquired from one or more acquisition devices 114 (e.g., sensor data, measurement data, and/or the like, communicated to input functionality of a CPCE 104, such as the ICSC 130A); acquired state data pertaining to a state of a physical process 105, physical process attribute 106, PPV 108, and/or otherwise involved in implementation of the CPCE 104 (e.g., state data produced and/or communicated by input functionality of the CPCE 104, such as the ICSC 130A); control decisions pertaining to the CPCE 104 (e.g., control decisions determined by control functionality of the CPCE 104, such as the ICSC 130B); actuation commands communicated to one or more actuation devices 116 (e.g., commands transmitted to actuation devices 116 by output functionality of the CPCE 104, such as the ICSC 130C); system commands from higher-level components 102, such as supervisory computing devices, RTUs, the terminal 103, and/or the like (e.g., CPS commands pertaining to operation of the CPCE 104, such as commands to activate/deactivate particular components 102, specify the target state and/or set point of a PPV 108, specify data acquisition parameters, specify control function parameters, specify actuation parameters, and so on).

A compromised ICSC 130 may be configured to inject malicious control system data into the cyber-physical system 100, which may be configured to disrupt the control system 101 and/or one or more CPCE 104. By way of non-limiting example, compromised input functionality of a CPCE 104 (e.g., ICSC 130A) may produce malicious state data that does not accurately reflect the state of the PPV 108 controlled by the CPCE 104, and which may result in control functionality of the CPCE 104 (e.g., ICSC 130B) generating invalid, potentially harmful control decisions. In another non-limiting example, compromised control functionality of the CPCE 104 (e.g., ICSC 130B) may output malicious control decisions, regardless of the state data acquired by the input functionality of the CPCE 104 (and/or control function(s) intended to be implemented thereby). By way of further non-limiting example, compromised output functionality (e.g., ICSC 130C) may transmit invalid, potentially harmful actuation commands to actuation device(s) 116, regardless of the control decisions produced by control functionality of the CPCE 104. In yet another non-limiting example, a compromised component may transmit invalid, potentially harmful system commands to other components 102 (e.g., other ICSC 130), which may further disrupt operation of the CPCE 104 and/or lead to compromise of additional components 102.

Since compromised components 102 may not respond to system commands (and/or may prevent system commands from reaching other components 102), it may be difficult, or even impossible, to isolate a compromised component 102 from the cyber-physical system 100 from external devices. Therefore, even if conventional security devices were capable of detecting attacks involving compromised ICSC 130 (and were capable of identifying the ICSC 130 compromised in such attacks), they would still be incapable of adequately responding to these attacks. Instead, responding to an attack involving a compromised ICSC 130 may require an operator to manually disconnect and/or replace the compromised ICSC 130, which can be tedious, error prone, and time-consuming. The longer a compromised ICSC 130 remains coupled to the control system 101, the risk of adverse consequences and/or likelihood that the attack will lead to compromise of additional components 102 increases (e.g., other ICSC 130).

FIG. 1A further illustrates an example of a device that can detect, prevent, mitigate, and/or recover from attacks directed against individual components 102 of the cyber-physical system 100. As illustrated, the cyber-physical system 100 may include a component security device 150. The component security device 150 may be configured to be deployed at the interface between a component 102 and the control system 101. The component security device 150 may, therefore, be capable of isolating the component 102 from the control system 101 (e.g., isolate the component 102 from other components 102 and/or CID 140 of the control system 101). The disclosed component security device 150 may be configured to monitor and/or interrupt services provided to the component 102 (e.g., interrupt power and/or communication services provided to an ICSC 130 by a CID 140, as disclosed herein). The component security device 150 may be configured to be disposed at and/or between the CIC 148 of an ICSC 130. The component security device 150 may be disposed between functional modules of a CPCE 104 and the control system 101. As illustrated in FIG. 1A, the component security device 150 may be disposed between control functionality of the CPCE 104 (e.g., ICSC 130B) and the CID 140. The component security device 150 may be configured to selectively couple and/or isolate the ICSC 130B from services of the CID 140, such as power services, communication services, and/or the like, as disclosed herein. The disclosed component security device 150 may, therefore, be capable of isolating a compromised ICSC 130 from the control system 101, even if the compromised ICSC 130 refuses to comply with system commands.

Figure 1B:
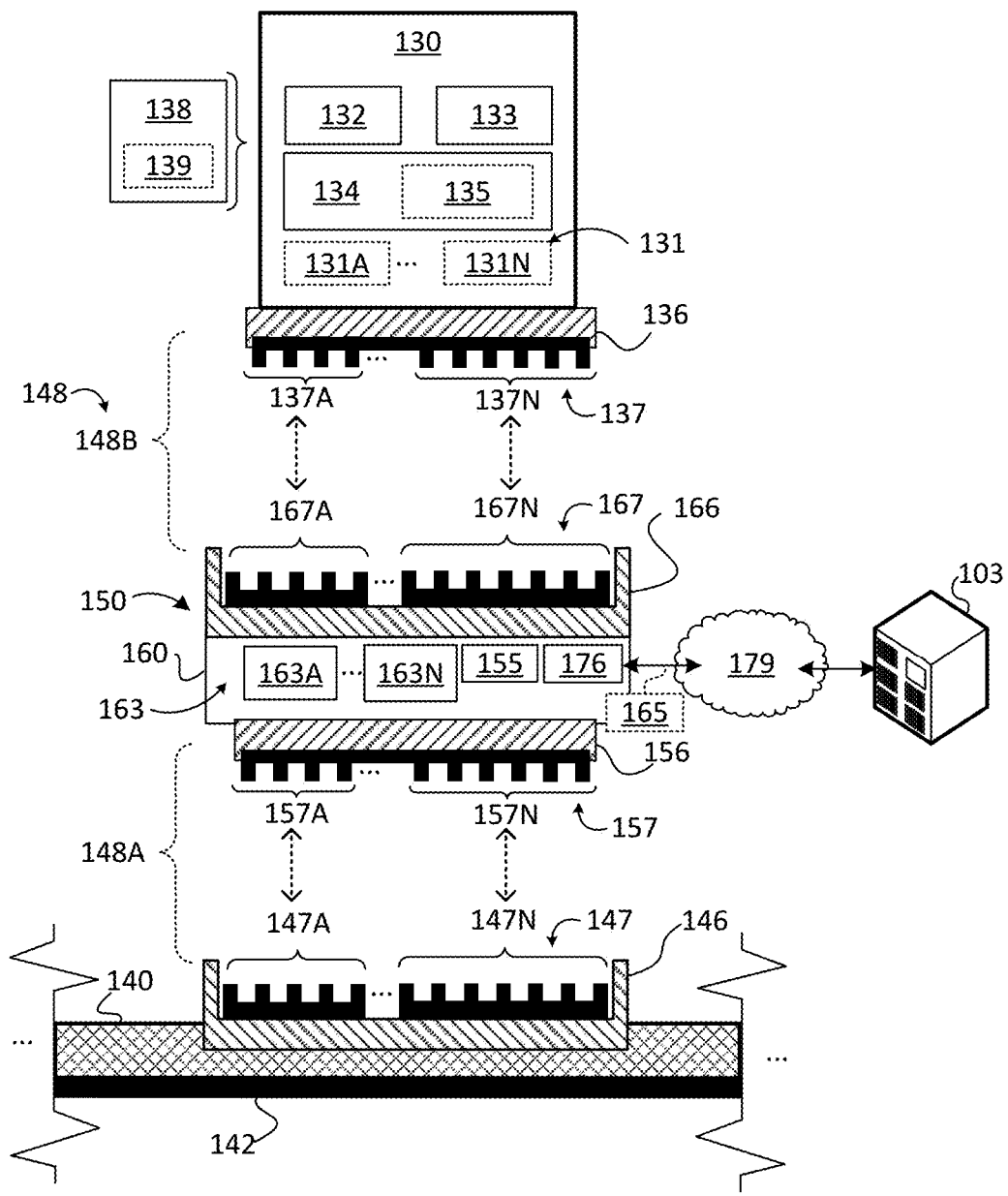
FIG. 1B illustrates an example of a device that can implement aspects of control system security, as disclosed herein.

FIG. 1B illustrates an example of a device that can implement aspects of control system security (e.g., a component security device 150). The component security device 150 may be configured to be disposed between an ICSC 130 and a CID 140. In some implementations, the component security device 150 may be configured to adapt the ICSC 130 for use with the CID 140 (e.g., may be configured to adapt an electrical interface scheme of the IC 146 of the CID 140 for use with the CC 136 of the ICSC 130, or vice versa). The component security device 150 may include a first coupler 156 configured to couple with the IC 146 of the CID 140. The first coupler 156 may include first connectors 157 configured to couple to respective IC connectors 147 (e.g., first power connectors 157A, first communication connectors 157N, and so on). The component security device 150 may further include a second coupler 166 configured to couple with the CC 136 of an ICSC 130. The second coupler 166 may include second connectors 167 configured to couple to respective CC connectors 137, as disclosed herein (e.g., second power connectors 167A, second communication connectors 167N, and so on). Establishing a CIC 148 between the ICSC 130 and the CID 140 may, therefore, include establishing a first CIC 148A between the CID 140 and the component security device 150 and a second CIC 148B between the component security device 150 and the ICSC 130. Accordingly, the component security device 150 may be capable of selectively coupling and/or isolating the ICSC 130 from services supplied by and/or through the CID 140, which may include selectively coupling and/or isolating the ICSC 130 from the cyber-physical system 100 (e.g., control system 101).

The component security device 150 may include and/or be coupled to a component manager 160 configured to manage coupling between the ICSC 130 and the CID 140. The component manager 160 may be configured to manage services provided to the ICSC 130 through the CIC 148 (and/or respective connection(s) between the CC 136 and the IC 146). The component manager 160 may be configured to selectively couple the ICSC 130 to services provided by and/or through the CID 140, which may include selectively coupling CC connectors 137 of the ICSC 130 to IC connectors 147 of the CID 140. The component manager 160 may be interposed disposed between the ICSC 130 and CID 140. The component security device 150 including the component manager 160 may, therefore, be referred to as a secure interposer, interposer security device, interposer security component, interposer security appliance, or the like.

The component manager 160 may be configured to monitor, analyze, control, and/or otherwise manage respective ICSC-to-CID connections. The component manager 160 may be configured to adapt an ICSC 130 for use with different types of CID 140 and/or IC 146 (reroute and/or reconfigure connections between CC connectors 137 of the ICSC 130 and IC connectors 147, or vice versa). In some implementations, the component manager 160 is configured to monitor and/or analyze connections between the ICSC 130 and the CID 140 and/or service(s) provided by and/or through such connections. The component manager 160 may be further configured to utilize services of the CID 140 provided through the IC 146, such as power supply services, communication services, and/or the like. The component manager 160 may be configured to monitor, analyze, control, and/or otherwise manage CIC 148 connections and/or services provided by and/or through such connections. The component manager 160 may include, but is not limited to: input circuitry, output circuitry, I/O circuitry, input buffer circuitry, output buffer circuitry, I/O buffer circuitry, repeater circuitry, repeater logic, signal sense circuitry, signal amplification circuitry, relay circuitry, relay logic, breaker circuitry, circuit breaker logic, switch circuitry, switch logic, routing circuitry, routing logic, multiplexer circuitry, multiplexer logic, interposer circuitry, interposer logic, data capture circuitry, data capture logic, communication circuitry, communication logic, communication processing circuitry, communication processing logic, communication capture circuitry, communication capture logic, communication filter circuitry, communication filter logic, sniffer circuitry, sniffer logic, packet inspection circuitry, packet inspection logic, packet interpretation and/or analysis circuitry, packet interpretation and/or analysis logic, power metering circuitry, power metering logic, power conversion circuitry, power regulation circuitry, power limit circuitry, power conditioning circuitry, power extraction circuitry, and/or the like. Although particular examples of devices for monitoring, analyzing, controlling, and/or otherwise managing a CIC 148 are described herein, the disclosure is not limited in this regard and could be adapted for use with any suitable mechanism for coupling a component 102 to a control system 101 and/or integration service(s) thereof.

In some implementations, the component manager 160 may include and/or correspond to respective connector groups and/or services. The component manager 160 may include one or more infrastructure service managers (managers 163), which may include, but are not limited to: a power manager 163A, a communication manager 163N, and/or the like. The power manager 163A may be configured to selectively couple the ICSC 130 to power supplied by and/or through the CID 140. The power manager 163A may be configured to monitor, analyze, control, and/or otherwise manage power supplied to the ICSC 130. The power manager 163A may be operably coupled to the first power connectors 157A and/or the second power connectors 167A, as disclosed herein. The power manager 163A may be configured to selectively couple the ICSC 130 to power supplied by and/or through the CID 140 (e.g., selectively connect CC power connectors 137A to IC power connectors 147A). In some implementations, the power manager 163A may be configured to reroute and/or reconfigure power connections (e.g., may function as an interposer, as disclosed herein). The power manager 163A may be configured to couple the ICSC 130 to selected power connections, each configured to supply power according to a respective power specification and/or to power respective functionality of the ICSC 130 (e.g., a particular functional module 138).

In some aspects, the power manager 163A is further configured to utilize power supplied by and/or through the CID 140 to, inter alia, power the component security device 150. The power manager 163A may be configured to extract power from IC power connectors 147A of the IC 146. The power manager 163A may be configured to extract power from the IC power connectors 147A while supplying power to the ICSC 130 (through CC power connectors 137A thereof). The power manager 163A may be configured to extract power, such that the power supplied to the ICSC 130 is substantially unchanged (e.g., remains at a specified voltage level). Alternatively, or in addition, the component security device 150 may be coupled to a separate power source, such as a power storage device (e.g., a battery, capacitor, and/or the like), separate IC 146, separate IC power connector 147A, and/or the like. The power manager 163A may be configured to power the component security device 150 independently of the ICSC 130 (e.g., regardless of whether the ICSC 130 is coupled thereto and/or receiving power through the CIC 148).

The communication manager 163N may be configured to selectively couple the ICSC 130 to communication services supplied by and/or through the CID 140 (through the CIC 148 established therebetween). The communication manager 163N may be configured to selectively couple CC communication connectors 137N of the ICSC 130 to IC communication connectors 147N (and/or vice versa). The communication manager 163N may be capable of selectively coupling the ICSC 130 to communication services of the CID 140 (e.g., selectively coupling the ICSC 130 to one or more electronic communication networks). The communication manager 163N may, therefore, be configured to selectively couple and/or isolate the ICSC 130 from the control system 101 (e.g., from the CID network 142, CPS network 122, and/or the like).

The communication manager 163N may be configured to utilize communication services provided by and/or through the CID 140. The communication manager 163N may be configured to communicatively couple the component security device 150 to the CID 140, and/or communication services provided thereby, independently of the ICSC 130 (e.g., regardless of whether the ICSC 130 is coupled thereto and/or receiving power through the CIC 148). The communication manager 163N may be configured to communicatively couple the component security device 150 to one or more electronic communication networks and/or communication interfaces, such as the CID network 142, the CPS network 122, an external network 109, and/or the like. The communication manager 163N may be configured to utilize communication interface(s) 131 of the ICSC 130 (e.g., may be coupled to the CID 140 without appearing as a separate device). The communication manager 163N may be configured to emulate communication by the ICSC 130 (e.g., may utilize endpoints, names, addresses, and/or other information of the ICSC 130). The communication manager 163N may be configured to transmit outbound communication through the CID 140 as if such communication were transmitted by the ICSC 130. The communication manager 163N may be further configured to filter inbound network communication, which may include capturing incoming messages received at the CIC 148, identifying messages pertaining to the component security device 150, and processing the identified messages without passing the identified messages through to the ICSC 130. Alternatively, or in addition, the communication manager 163N may include and/or implement a separate communication interface. The communication manager 163N may represent the component security device 150 as a distinct component 102 on the CID network 142 having a respective address, backplane address, bus address, Media Access Control (MAC) address, and/or the like.

The component security device 150 may further include a security engine 155. The security engine 155 may be configured to implement one or more mitigation actions in response to an anomaly detection pertaining to the ICSC 130. As used herein, an "anomaly detection" refers to information pertaining to detection of anomalous behavior and/or operating conditions of a cyber-physical system 100, control system 101, and/or component(s) 102 thereof (e.g., an ICSC 130). An anomaly detection pertaining to an ICSC 130 may include, but is not limited to, information pertaining to: anomalous behavior of the ICSC 130, anomalous cyber behavior of the ICSC 130 (e.g., anomalous network activity, anomalous inbound network traffic, anomalous output network traffic, and/or the like), anomalous functional behavior of the ICSC 130 (e.g., the ICSC 130 receiving anomalous control system data, the ICSC 130 producing and/or transmitting anomalous control system data), anomalous operating conditions of the ICSC 130 (e.g., high temperature, high power consumption, and/or the like), an anomaly pertaining to a component 102 coupled to the ICSC 130 (e.g., another ICSC 130), and/or the like. An anomaly detection may indicate detection of an attack involving the ICSC 130 (e.g., an attack having an attack vector including the ICSC 130 and/or directed against the ICSC 130). In some implementations, the anomaly detection may indicate that the ICSC 130 is compromised (e.g., may indicate that the ICSC 130 is involved in dissemination of malicious control system data, as disclosed herein).

The mitigation actions implemented by the security engine 155 in response to an anomaly detection may include, but are not limited to: isolating the ICSC 130 from the CID 140 (thereby isolating the ICSC 130 from the control system 101), disconnecting the ICSC 130 from service(s) provided by and/or through the CID 140, disconnecting the ICSC 130 from power supply services, disconnecting the ICSC 130 from communication services, and/or the like. The security engine 155 may be configured to isolate the ICSC 130 from the CID 140 by use of the component manager 160, as disclosed herein. Isolating the ICSC 130 from the CID 140 (and/or control system 101) may include interrupting the CIC 148 between the ICSC 130 and the CID 140, thereby isolating the ICSC 130 from other components 102 of the cyber-physical system 100. Isolating the ICSC 130 may include disconnecting CC connectors 137 of the ICSC 130 from IC connectors 147 of the CID 140. Disconnecting the ICSC 130 from service(s) of the CID 140 may include disconnecting CC power connectors 137A of the ICSC 130 from IC power connectors 147A, disconnecting CC communication connectors 137N of the ICSC 130 from IC communication connectors 147N, and so on. Isolating the ICSC 130 from the control system 101 may, therefore, include disconnecting power from the ICSC 130. Alternatively, isolating the ICSC 130 from the control system may include reducing and/or otherwise modifying power supplied to the ICSC 130 by and/or through the CID 140. The power supply modifications may be configured to modify functionality of the ICSC 130 (e.g., may be configured to cause the ICSC 130 to operate in a reduced functionality mode, as disclosed herein). Isolating the ICSC 130 may include modifying communication services provided by and/or through the CID 140 while continuing to provide power to the ICSC 130. Isolating the ICSC 130 may include blocking communication to and/or from the ICSC 130, which may include modifying (e.g., blocking) communication of the ICSC 130 on one or more: electronic communication networks (e.g., CID network 142, CPS network 122, device-to-device networks, and/or the like), communication interfaces 131, communication channels, downstream communication channels, upstream communication channels, incoming network communication, outbound network communication, and/or the like. Isolating an ICSC 130 may include disconnecting communication interfaces 131 by which the ICSC 130 implements functionality of the control system 101 (e.g., implements functionality of a CPCE 104).

In the FIG. 1A example, isolating the ICSC 130A (configured to implement input functionality of the CPCE 104) may include disconnecting the ICSC 130A from control functionality of the CPCE 104 (e.g., blocking outbound communication to the ICSC 130B on the CID 140); isolating the ICSC 130B (control functionality of the CPCE 104) may include blocking communication interfaces 131 coupling the ICSC 130B to output functionality of the CPCE 104 (e.g., ICSC 130C); isolating the ICSC 130C (output functionality of the CPCE 104) may include blocking communication interfaces 131 coupling the ICSC 130C to control and/or actuation functionality of the CPCE 104 (e.g., ICSC 130B and/or the actuation device 116); and so on. In some implementations, isolating an ICSC 130 may further include maintaining selected communication interfaces 131 of the ICSC 130. The selected communication interfaces 131 may enable the component security device 150 (and/or other components 102 of the cyber-physical system 100) to implement forensic operations on the ICSC 130 (e.g., interrogate the ICSC 130), recover from attack or compromise of the ICSC 130, and/or the like, as disclosed herein.

The component security device 150 may be further configured to detect anomalies pertaining to the ICSC 130 (e.g., detect attack and/or compromise of the ICSC 130 and issue corresponding security commands 165, as disclosed herein). The component security device 150 may be configured to detect anomalies based on and/or in response to monitoring the ICSC 130, monitoring cyber behavior of the ICSC 130, monitoring functional behavior of the ICSC 130, monitoring utilization of service(s) provided by and/or through the CID 140 by the ICSC 130 (e.g., monitoring utilization of power, communication, and/or other services by the ICSC 130), and/or the like. Alternatively, or in addition, the component security device 150 may be configured to receive information pertaining to anomalies from one or more other components 102 of the cyber-physical system 100. As illustrated in FIG. 1B, the component security device 150 may be configured to receive security commands 165. A security command 165 may include information pertaining to an anomaly detection, as disclosed herein (e.g., may indicate that the ICSC 130 is being attacked and/or is compromised). The security engine 155 may receive security commands 165 from security components of the control system 101, such as a cyber security component 123 (e.g., an intrusion detection component), a perimeter security component 124, and/or the like. The security components 123, 124 may be configured to detect attacks involving compromised ICSC 130, as disclosed herein (e.g., based on monitoring network communication on the CPS network 122). The security components 123, 124, however, may be incapable of adequately responding to these types of attacks (e.g., since, inter alia, the compromised ICSC 130 may not respond to system commands and/or may disrupt implementation of system commands by other components 102). Rather than allowing compromised ICSC 130 to remain coupled to the cyber-physical system 100, the disclosed component security device 150 may be configured to isolate the ICSC 130 in response to anomaly detections. In some aspects, the security components 102 of the cyber-physical system 100 may be configured to transmit security commands 165 to the component security device 150 through an electronic communication network (e.g., the CPS network 122, and/or the like). Alternatively, or in addition, security commands 165 may be communicated by other components 102 in response to anomaly detections (e.g., security commands 165 may be transmitted by a supervisory computing device, an RTU, the terminal 103, and/or the like). The security engine 155 may be configured to implement mitigation actions in response to the security commands 165, as disclosed herein.

The communication manager 163N may be configured to detect and/or derive security commands 165 from messages communicated to the ICSC 130. The communication manager 163N may be configured to capture and/or inspect messages directed to the ICSC 130 (e.g., capture and/or inspect messages received through the IC communication connectors 147N). The communication manager 163N may be configured to detect messages that include system commands, such as system commands configured to disconnect the ICSC 130 from the control system 101 (e.g., shutdown commands, deactivate commands, and/or the like). The communication manager 163N may treat such commands as security commands 165, which may configure the security engine 155 to isolate the ICSC 130 from the control system 101, as disclosed herein. The component security device 150 may, therefore, isolate the ICSC 130 from the control system 101, regardless of whether the ICSC 130 is capable of responding to system commands (and/or commands issued directly through the CC communication connectors 137N thereof).

The component security device 150 may be configured to receive security commands 165 communicated on one or more electronic networks. The component security device 150 may be configured to receive security commands 165 by use of, inter alia, the communication manager 163N, which may be configured to couple the component security device 150 to communication services of the CID 140, as disclosed herein (e.g., to the CID network 142, CPS network 122, external network(s) 109, and/or the like). Alternatively, or in addition, the component security device 150 may include a secondary communication interface 176, which may be configured to communicatively couple the component security device 150 to a secondary communication network 179. The CID network 142 and/or CPS network 122 may, therefore, be a primary network.

The secondary communication network 179 may include any suitable electronic communication network, as disclosed herein. The secondary communication network 179 may be separate from the primary network (e.g., CID network 142 and/or CPS network 122). The secondary communication network 179 may include a wireless network. The secondary communication network 179 may be coupled to one or more components of the cyber-physical system 100 (e.g., cyber security components 123, perimeter security components 124, a supervisory computing device, HMI components, a terminal 103 as illustrated in FIG. 1B, and/or the like). The component security device 150 may be configured to receive security commands 165 through the secondary communication network 179 and, in response, selectively disconnect the ICSC 130 from the control system 101, as disclosed herein.

A security command 165 may specify one or more mitigation actions. The security engine 155 may be configured to implement the specified mitigation actions, which may include isolating the ICSC 130 from the control system 101, as disclosed herein (e.g., disconnecting the ICSC 130 from power, communication interface(s) 131, and/or the like). A security command 165 may be configured to cause the component security device 150 to reconnect the ICSC 130 to the control system 101 (e.g., after replacement and/or recovery of the ICSC 130). An ICSC 130 may be reconnected to the control system 101 in response to determining that the ICSC 130 is no longer compromised (e.g., has recovered from the anomaly and/or attack). In response to such a security command 165, the security engine 155 may configure the component manager 160 to couple the ICSC 130 to the control system 101, which may include coupling the ICSC 130 to services provided by and/or through the CID 140 (e.g., couple CC connectors 137 of the ICSC 130 to IC connectors 147 of the IC 146).

As disclosed herein, the component security device 150 may be directly coupled to services of the control system 101 (e.g., may be coupled to power, communication, and/or other services provided by and/or through an IC 146 of the CID 140). The component security device 150 may be coupled to the control system 101 independently of the ICSC 130 (e.g., regardless of whether the ICSC 130 is coupled to the control system 101 and/or respective services(s) provided by and/or through the CID 140). The component security device 150 may be capable of managing access to services by the ICSC 130, independently of the ICSC 130. The component security device 150 may, therefore, be capable of isolating the ICSC 130 from the control system 101 (and reconnecting the ICSC 130 thereof) regardless of the state of the ICSC 130. The component security device 150 may be capable of isolating the ICSC 130 from the control system 101 regardless of whether the ICSC 130 is responding to system commands (and/or commands issued directly through the CC communication connectors 137N thereof). The component security device 150 may be further configured to reconnect the ICSC 130 to the control system 101 even if the ICSC 130 is currently disconnected from power.

In some implementations, components 102 of the control system 101 may be configured to respond to removal (and/or failure) of one or more other components 102, such as an ICSC 130. The components may be configured to operate in a mitigation mode. As disclosed herein, a mitigation mode refers to an operational mode of a component 102 configured to mitigate adverse effects of isolation of other component(s) 102 from the control system 101 (e.g., isolation of ICSC 130 by respective component security devices 150, due to attack, compromise, failure, and/or the like). A mitigation mode may refer to a mode in which a component 102 is configured to operate without the one or more other components 102, without functionality implemented by the other components 102, with functionality implemented by other components 102 (e.g., failover functionality), and/or the like. By way of non-limiting example, mitigation mode operation may include: an actuation device 116 being configured to maintain PPV 108 (e.g., physical process(es) 105 and/or physical process attribute(s) 106 thereof) at specified "mitigation" states and/or set points in response to interruption of output functionality of the control system 101 (e.g., in response to interruption of output functionality implemented by the ICSC 130C, such as being disconnected from the ICSC 130C and/or failing to receive actuation command(s) for a threshold period of time); output functionality of the control system 101 (e.g., ICSC 130C) being configured to output specified "mitigation" actuation command(s) configured to cause actuation device(s) 116 to maintain PPV 108 at specified mitigation states and/or set points in response to interruption of control functionality of the control system 101 (e.g., in response to being disconnected from the ICSC 130B and/or failing to receive control decision(s) for a threshold period of time); control functionality of the control system (e.g., ICSC 130B) being configured to output "mitigation" control decisions configured to cause output functionality (e.g., ICSC 130C) to produce mitigation actuation command(s) in response to being disconnected from input functionality of the control system 101

(e.g., in response to being disconnected from the ICSC 130A and/or failing to receive acquired state data for a threshold period of time); and so on.

As disclosed above, a component 102 of the control system 101 (e.g., an ICSC 130) may be configured to operate in a mitigation mode in response to detecting removal of another component 102 (e.g., another ICSC 130). Alternatively, or in addition, a component 102 may be configured to operate in mitigation mode in response to network communication, such as a message, system command, security command 165, and/or the like. The component security device 150 may be configured to cause the ICSC 130 coupled thereto to operate in accordance with specified operational modes. The component security device 150 may configure the ICSC 130 to operate in a mitigation mode in response to a security command 165 received from another component 102 (e.g., a component security device 150 coupled to another ICSC 130). The component security device 150 may configure the ICSC 130 to operate in a mitigation mode in response to a security command 165 indicating that one or more other ICSC 130 are being disconnected from the control system 101. The component security device 150 may configure the ICSC 130 to operate in the mitigation mode by issuing commands thereto (e.g., by issuing commands to the ICSC 130 through one or more CC communication connectors 137 of the CC 136 of the ICSC 130, through one or more communication interfaces 131 of the ICSC 130, and/or the like).

When isolating a particular ICSC 130, the component security device 150 may be further configured to notify other components 102 of the control system 101 that the particular ICSC 130 is being isolated from the control system 101. The component security device 150 may communicate with the other components 102 by use of the communication manager 163N, as disclosed herein (e.g., by use of communication services provided by and/or through the CID 140). Alternatively, or in addition, the component security device 150 may communicate through one or more alternative communication mechanisms, such as a secondary communication network 179. The component security device 150 may configure other components 102 to isolate the particular ICSC 130 therefrom (e.g., operate in a mitigation mode, as disclosed herein). In some implementations, component security device 150 may be configured to cause other component security devices 150 coupled to other ICSC 130 to isolate the particular ICSC 130 therefrom (e.g., interrupt communication and/or from the particular ICSC 130).

Figure 2A:
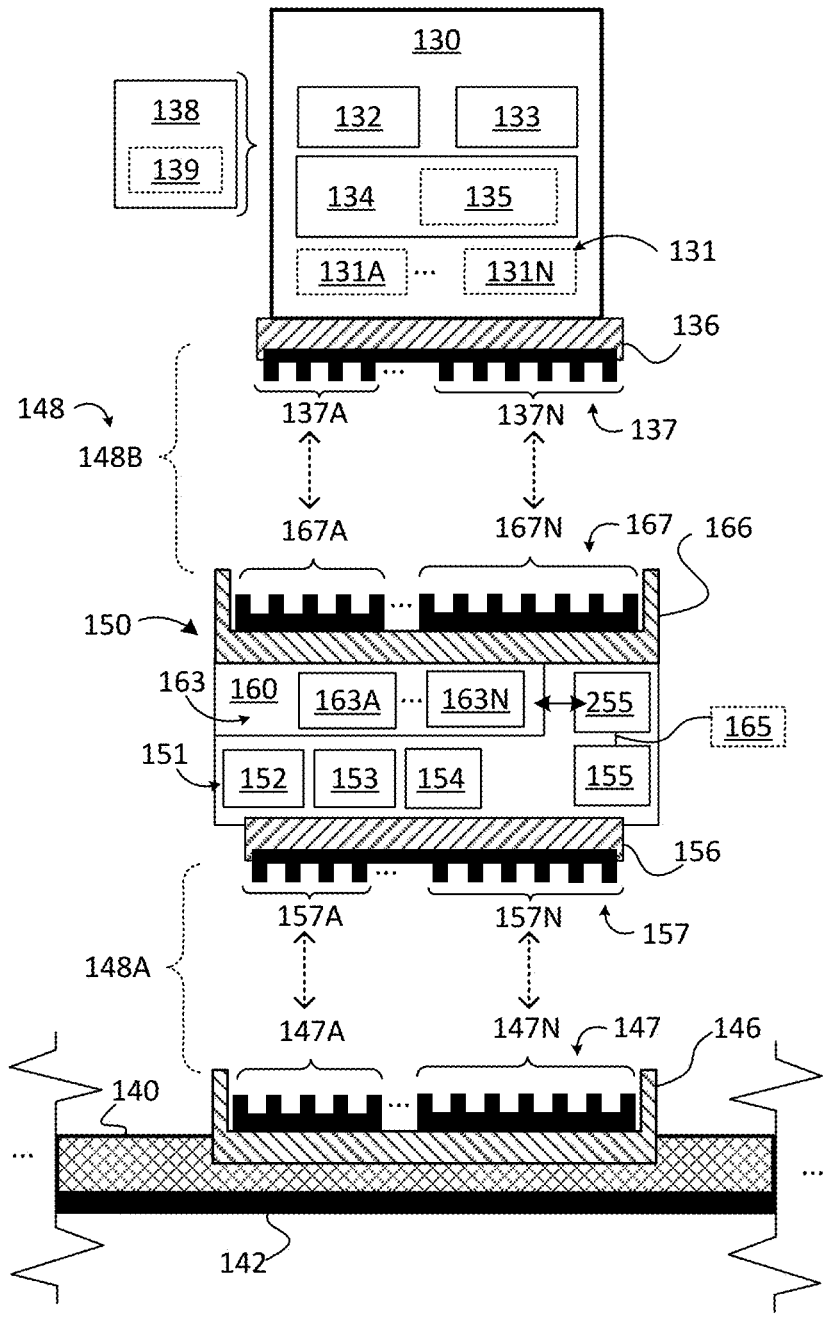
FIG. 2A illustrates an example of a component security device.

FIG. 2A illustrates another example of a device that can implement aspects of control system security, as disclosed herein. In the FIG. 2A example, the component security device 150 may include computing resources 151, such as processing resources 152, memory resources (memory 153), persistent storage resources 154, and/or the like. The security engine 155 may be configured to monitor the ICSC 130, which may include detecting anomalies pertaining to the ICSC 130 and/or generating corresponding security commands(s) 165.

The component security device 150 may further include a component manager 160 configured to selectively couple the ICSC 130 to service(s) provided by and/or through the CID 140. The component manager 160 may include a power manager 163A configured to selectively couple the ICSC 130 to power supply services. In the FIG. 2A example, the power manager 163A is further configured to control and/or manage power supplied to the ICSC 130. The power manager 163A may be configured to decrease power supplied to the ICSC 130, disconnect the ICSC 130 from power, disconnect power from one or more functional modules 138 of the ICSC 130, and/or the like. For example, the power manager 163A may be configured to cause the ICSC 130 to operate in a selected mode, such as a normal operating mode, a reduced functionality mode, an inactive mode, and/or the like. Configuring the ICSC 130 to operate in normal mode may include causing the power manager 163A to supply a full or nominal amount of power to the ICSC 130 (e.g., act as a pass-through in the CIC 148 coupling the ICSC 130 to the CID 140). Configuring the ICSC 130 to operate in a reduced functionality mode may include causing the power manager 163A to supply less than a full or nominal amount of power to the ICSC 130. The ICSC 130 may be configured to reduce the amount of power supplied to the ICSC 130 to a level below the full or nominal amount (e.g., limit current drawn by the ICSC 130, disconnect the ICSC 130 from one or more power supply connections, and/or the like). Configuring the ICSC 130 to operate in an inactive mode may include causing the power manager 163A top supply a lower amount of power to the ICSC 130. The inactive mode may correspond to a hibernate mode of the ICSC 130 in which the state of the processing resources 132 and/or memory 133 thereof are maintained. Alternatively, the inactive mode may correspond to a sleep mode in which the state of the processing resources 132 and/or memory 133 thereof are transferred to persistent storage 134. The power manager 163A may be configured to transition the ICSC 130 to a lower power mode in accordance with a power management protocol (e.g., may notify the ICSC 130 of the reduction to power prior to removing and/or reducing power supplied thereto).

The power manager 163A may be further configured to monitor power consumption of the ICSC 130. The power manager 163A may be configured to determine measure power consumption by the ICSC 130 (e.g., measure input power to the ICSC 130, such as input wattage, input voltage, current drawn by the ICSC 130, and/or the like). The power manager 163A may be further configured to capture and/or maintain information pertaining to power consumption of the ICSC 130 over time (e.g., maintain a power consumption history, power consumption patterns, power consumption models, and/or the like).

In some implementations, the component security device 150 further includes a communication manager 163N configured to selectively couple the ICSC 130 to communication services of the CID 140, as disclosed herein. In the FIG. 2A example, the communication manager 163N is further configured to monitor and/or analyze communication services utilized by the ICSC 130. The communication manager 163N may be configured to monitor network traffic to and/or from the ICSC 130 (e.g., by use of capture circuitry, sniffer circuitry, and/or the like, as disclosed herein). The communication manager 163N may be further configured to monitor particular network communication features during respective time periods (e.g., time windows), which may include, but are not limited to: time between messages, mean time between messages, message latency, mean message latency, number of messages per destination, number of message sources, message size, mean message size, number of zero size messages, message data length, mean message data length, maximum data length, data transfer speed, and/or the like. The communication manager 163N may be further configured to detect changes in network communication to and/or from the ICSC 130 by, inter alia, comparing monitored network communication features to one or more network communication thresholds, patterns, models, and/or the like.

The communication manager 163N may be configured to monitor, analyze, control and/or otherwise manage respective communication interfaces 131 of the ICSC 130. In some implementations, communication manager 163N is configured to manage communication connections corresponding to respective communication interfaces 131 (e.g., CC communication connectors 137N corresponding to respective communication interfaces 131A-N). Alternatively, or in addition, the communication manager 163N may be configured to detect messages pertaining to respective communication interfaces 131A-N transmitted on a same and/or common set of communication connections. The communication manager 163N may be configured to associate messages with a respective communication interface 131 based on, inter alia, message metadata, such as message protocol metadata, message address metadata, message routing metadata, and/or the like. The communication manager 163N may be configured to extract, interpret, inspect, and/or analyze message metadata by use of, inter alia, communication processing circuitry and/or logic, as disclosed herein (e.g., capture circuitry, capture logic, filter circuitry, filter logic, sniffer circuitry, sniffer logic, packet inspection circuitry, packet inspection logic, packet interpretation and/or analysis circuitry, packet interpretation and/or analysis logic, and/or the like). The communication manager 163N may, therefore, be capable of enabling and/or disabling selected communication interfaces 131 of the ICSC 130. Disabling a communication interface 131 may comprise disconnecting communication connections corresponding to the communication interface 131. Alternatively, or in addition, to disable a particular communication interface 131, the communication manager 163N may be configured to inspect messages received at the CIC 148 (e.g., output messages from the ICSC 130 and/or inbound messages from the CID 140), identify messages corresponding to the particular communication interface 131, and block communication of the identified messages through the CIC 148. The communication manager 163N may, therefore, be configured to disable a first communication interface 131A of the ICSC 130, while communication via a second communication interface 131N, that utilizes the same and/or overlapping CC communication connectors 137N of the ICSC 130, is enabled.

The communication manager 163N may be further configured to monitor network communication pertaining to respective communication interfaces 131 of the ICSC 130. The communication manager 163N may be configured to capture messages to and/or from the ICSC 130, associate the captured messages with respective communication interfaces 131, and derive network communication features from the captured messages associated with the respective communication interfaces 131, as disclosed herein.

The communication manager 163N may be further configured to analyze communication to and/or from the ICSC 130. The communication manager 163N may be configured to inspect messages transmitted to and/or from the ICSC 130 and/or associate the messages with respective communication interfaces 131, as disclosed herein. The communication manager 163N may be further configured to extract, interpret, and/or analyze contents of selected messages. The communication manager 163N may be configured to extract information pertaining to the control system 101 and/or CPCE 104 from the captured messages, including, but not limited to: data communicated from one or more acquisition device(s) 114 (e.g., data transmitted from the acquisition device 114 to input functionality of a CPCE 104, such as the ICSC 130A), acquired state data (e.g., acquired state data transmitted from input functionality to control functionality of the CPCE 104, such as the ICSC 130B), control decisions (e.g., control decisions communicated from control functionality to output functionality of the CPCE 104, such as the ICSC 130C), actuation commands communicated to one or more actuation device(s) 116 (e.g., actuation commands transmitted by output functionality of the CPCE 104), and so on.

In the FIG. 2A example, the component security device 150 may further include and/or be coupled to a security sensor 255. The security sensor 255 may be configured to detect anomalies pertaining to the ICSC 130. The security sensor 255 may be further configured to generate security commands 165 in response to detecting anomalies indicating that the ICSC 130 is subject to attack and/or has been compromised. Alternatively, or in addition, the security sensor 255 may be configured to receive security commands 165 pertaining to the ICSC 130 from one or more other components 102 of the control system 101, as disclosed herein (e.g., via the CID network 142, CPS network 122, secondary communication network 179, and/or the like).

The security sensor 255 may be configured to monitor utilization of services by the ICSC 130, as disclosed herein. The security sensor 255 may be configured to monitor power consumption of the ICSC 130 (by use of the power manager 163A), monitor network communication pertaining to the ICSC 130 (by use of the communication manager 163N), and so on. The security sensor 255 may be configured to detect anomalies pertaining to utilization of the services in response to the monitoring. The security sensor 255 may be configured to detect anomalies by, inter alia, comparing information indicating current utilization of services by the ICSC 130 to utilization of such services by the ICSC 130 over time (e.g., at previous times), to utilization patterns, utilization models, and/or the like.

The security sensor 255 may be further configured to monitor functional behavior of the ICSC 130. The security sensor 255 may be configured to capture, inspect, and/or evaluate control system data produced by the ICSC 130, which may include, but is not limited to: state data pertaining to one or more PPV 108 determined by input functionality implemented by the ICSC 130, control decisions determined by control functionality implemented by the ICSC 130, actuation commands determined by output functionality implemented by the ICSC 130, and/or the like. The security sensor 255 may be configured to evaluate the control system data by use of one or more thresholds, patterns, models, and/or the like. The security sensor 255 may be configured to compare state data pertaining to a physical process 105 generated by the ICSC 130 to physical constraints of the physical process 105 (e.g., compare the rotational speed of an electric motor to input power and/or load on the motor). In another example, the security sensor 255 may be configured to compare control decisions determined by the ICSC 130 (and/or corresponding actuation commands) to capabilities of the physical process 105 and/or actuation devices 116 coupled thereto.

In some implementations, the security sensor 255 may be further configured to detect anomalies pertaining to the ICSC 130 based on, inter alia, information communicated from other components 102 of the control system 101. The security sensor 255 may be configured to receive information pertaining to cyber behavior of the ICSC 130 from one or more network security components (e.g., cyber security components 123, perimeter security components 124, and/or the like). The security sensor 255 may be further configured to receive information pertaining to functional behavior of the ICSC 130. By way of non-limiting example, the security sensor 255 may be configured to receive information pertaining to state data produced by the ICSC 130 from control functionality of the control system 101. By way of further non-limiting example, the security sensor 255 may be configured to receive information indicating that control decisions determined by the ICSC 130 are anomalous (from output functionality of the control system 101), and so on. The security sensor 255 may be configured to receive information from other components 102 via communication services provided by and/or through the CID 140, as disclosed herein (e.g., by use of the communication manager 163N). Alternatively, or in addition, the component security device 150 may be communicatively coupled to one or more alternative communication networks, such as the secondary communication network 179 illustrated in FIG. 1B.

The security sensor 255 may be configured to determine a health metric for the ICSC 130, which may be derived based on, inter alia, utilization of services by the ICSC 130, cyber behavior of the ICSC 130, functional behavior of the ICSC 130, information pertaining to the ICSC 130 received from other components 102 of the control system 101, and/or the like. The security sensor 255 may be configured to determine that the ICSC 130 is subject to cyberattack (and/or is compromised) in response to the health metric failing to satisfy one or more thresholds. The security sensor 255 may be configured to detect anomalies by use of one or more machine learning (ML) modules, such as a fuzzy logic based anomaly detector, or the like (not shown in FIG. 2A to avoid obscuring details of the illustrated examples).

In response to detecting an anomaly pertaining to the ICSC 130, the security sensor 255 may be configured to instruct the security engine 155 to implement one or more mitigation actions, as disclosed herein. The security sensor 255 may be configured to communicate a security command 165 to the security engine 155, which may instruct the security engine 155 to isolate the ICSC 130 from the control system 101, as disclosed herein. The security sensor 255 may be further configured to notify other components 102 of the control system 101 that the ICSC 130 is being decoupled therefrom, as disclosed herein (e.g., configure the other components 102 to operate in a mitigation mode). Alternatively, or in addition, the security sensor 255 may be configured to receive and/or implement security commands 165 pertaining to the ICSC 130 from one or more other components 102, as disclosed herein.

Figure 2B:
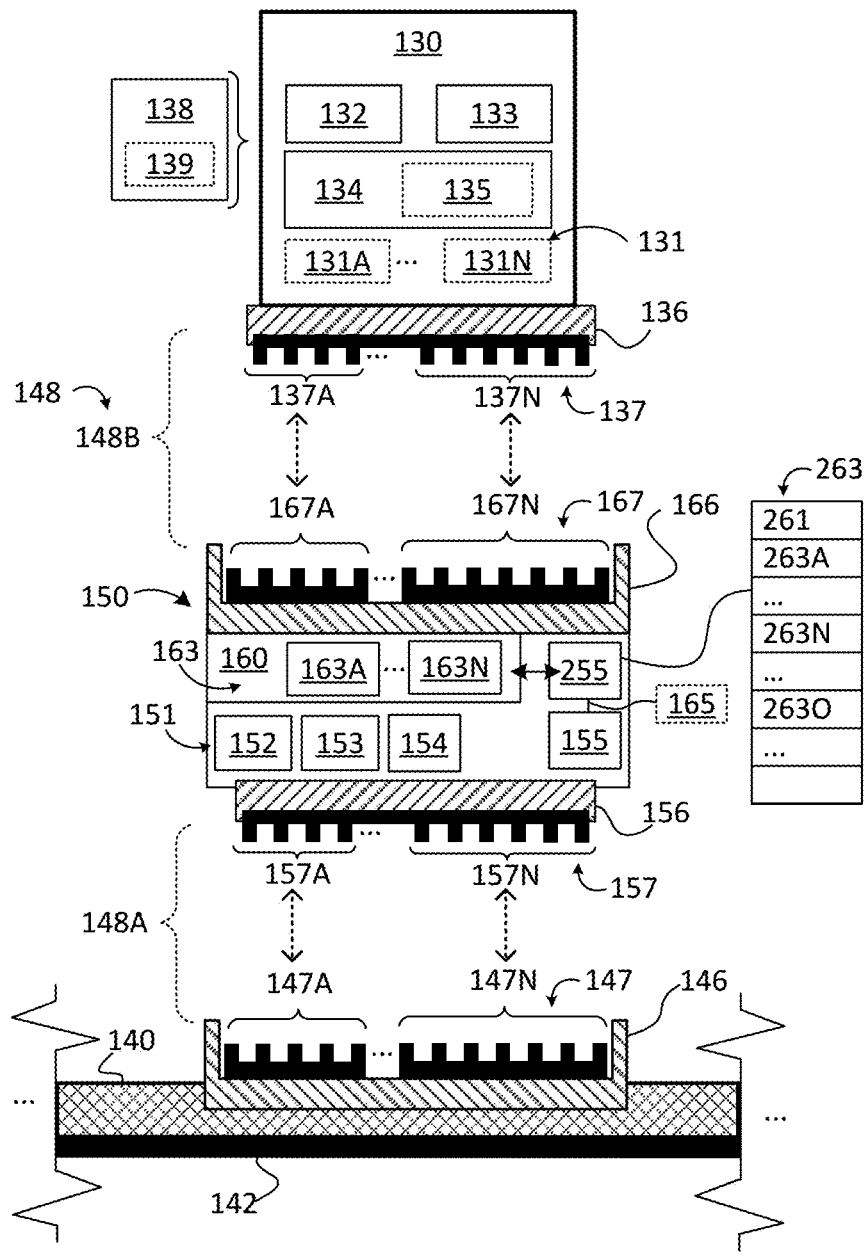
FIG. 2B illustrates another example of a component security device.

FIG. 2B illustrates another example of a component security device 150 that includes and/or is coupled to a security sensor 255, as disclosed herein. In the FIG. 2B example, the security sensor 255 may be configured to monitor and/or characterize behavior of the ICSC 130. The security sensor 255 may be configured to develop and/or maintain a profile 263 of the ICSC 130 (e.g., an ICSC profile). The profile 263 may include features pertaining to various operating conditions and/or behaviors of the ICSC 130, such as nominal, healthy operation, abnormal operation, operation indicative of cyberattack, operation indicative of compromise, and/or the like. The profile 263 may be maintained within non-transitory storage, such as persistent storage resources 154 of the component security device 150.

Figure 3:
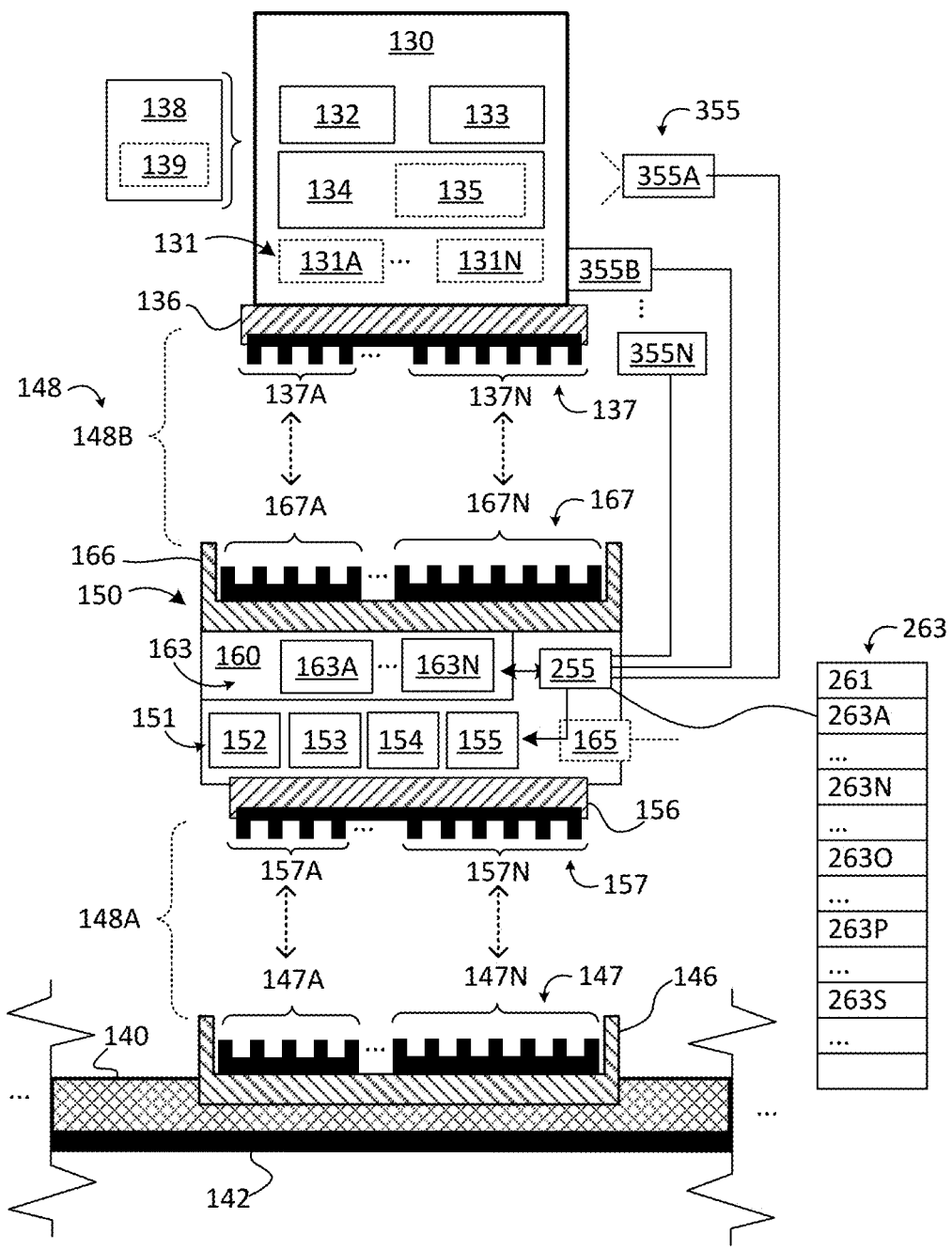
FIG. 3 illustrates an example of a component security device that includes and/or is coupled to one or more sensor devices.

In some implementations, the profile 263 may include information pertaining to one or more side channels of the ICSC 130. As used herein, a "side channel" refers to a mechanism through which an ICSC 130 may be attacked and/or information pertaining to the ICSC 130 may be exposed to an attacker. The security sensor 255 may be configured to monitor respective side channels of the ICSC 130, which may include and/or correspond to one or more of: timing information (e.g., timing of signals communicated through the CIC 148), power consumption of the ICSC 130, electromagnetic radiation emissions, radio frequency emissions, acoustic emissions, haptic emissions (e.g., vibrations), heat generation, gradient heat characteristics of respective elements of the ICSC 130, a combination or aggregation of side channels, and/or the like. The security sensor 255 may be configured to monitor side channels of the ICSC 130 at the CIC 148 between the ICSC 130 and the CID 140. Alternatively, or in addition, the security sensor 255 may be configured to monitor side channels by use of one or more sensor devices (e.g., ICSC sensor devices 355, as illustrated in FIG. 3).

Monitoring the side channels may further include developing and/or maintaining a side channel profile 261, which may include characteristics, features, patterns, and/or models for respective side channels. The side channel profile 261 may include one or more side channel patterns, which may be configured to characterize behavior of respective side channels over time, at particular times, while the ICSC 130 implements particular functionality, and/or the like. The side channel profile 261 may further include side channel models, which may be configured to predict and/or estimate characteristics and/or features of respective side channels at particular times and/or under particular conditions. The side channel profile 261 may include and/or correspond to an ML module configured to characterize behaviors of respective side channels of the ICSC 130 (e.g., a fuzzy logic anomaly detector). The security sensor 255 may be configured to detect anomalies pertaining to ICSC 130 side channels in response to monitoring the side channel(s) and/or comparing monitored behavior of the side channels to the side channel profile 261, as disclosed herein. The security sensor 255 may be configured to detect attack and/or compromise of the ICSC 130, and generate corresponding security commands 165 to, inter alia, isolate the ICSC 130 from the control system 101, in response to monitoring side channels of the ICSC 130. In some examples, the security sensor 255 may be configured to detect side channel attacks based, at least in part, on the monitoring (e.g., in response to determining that one or more side channels of the ICSC 130 are exhibiting characteristics indicative of a side channel attack). Alternatively, or in addition, the security sensor 255 use the side channel profile 261 to detect other types of attacks, such as cyber attacks or the like. The security sensor 255 may detect cyberattacks by through side channels without being directly part of the cyber communication channel (e.g., without directly monitoring the CPS network 122).

The profile 263 of an ICSC 130 may include information pertaining to operating conditions of the ICSC 130, such as a temperature of the ICSC 130, a temperature of respective ICSC 130 elements (e.g., processing resources 132, memory 133, or the like), gradient heat characteristics of the ICSC 130 and/or respective elements thereof, and/or the like, as disclosed herein. The security sensor 255 may be configured to monitor operating conditions of the ICSC 130 by use of one or more sensor devices, such as an ICSC sensor device 355 as illustrated in FIG. 3. The operating conditions of the ICSC 130 may correspond to one or more side channels, as disclosed herein.

The security sensor 255 may be further configured to monitor utilization of services by the ICSC 130. The security sensor 255 may be configured to monitor service utilization in addition to or in place of the side channel monitoring disclosed herein. The profile 263 of the ICSC 130 may include information pertaining to utilization of power supply services, communication services, and/or the like. In the FIG. 2B example, the security sensor 255 may be configured to maintain a power profile 263A for the ICSC 130, which may include characteristics and/or features corresponding to power consumption by the ICSC 130 (e.g., may track power consumption by the ICSC 130 over time and/or under different operating conditions). Alternatively, or in addition, the monitored power consumption may correspond to a side channel of the ICSC 130, as disclosed herein. The power profile 263A may include one or more power consumption thresholds, which may be indicative of power consumed by the ICSC 130 during nominal operation. Exceeding the power consumption thresholds may, therefore, be indicative of anomalous ICSC 130 behavior. The power profile 263A may further include one or more power consumption patterns, which may indicate power consumed by the ICSC 130 at particular times and/or while implementing particular functionality. The power profile 263A may include a power consumption model, which may estimate power consumption by the ICSC 130 under particular conditions (e.g., while the ICSC 130 implements particular functional modules 138). As disclosed above, the security sensor 255 may be configured to monitor power consumption of the ICSC 130, which may include measuring power consumption of the ICSC 130 and/or comparing the measured power consumption to the power profile 263A (e.g., comparing current power consumption of the ICSC 130 with one or more power consumption thresholds, power consumption patterns, power consumption models, and/or the like). In some implementations, the power profile 263A may include and/or correspond to an ML module configured to characterize power consumption behavior of the ICSC 130 (e.g., a fuzzy logic anomaly detector). The security sensor 255 may be configured to detect anomalies pertaining to ICSC 130 power consumption in response to the power monitoring, as disclosed herein.

The security sensor 255 may be further configured to develop and/or maintain profiles pertaining to other services utilized by the ICSC 130. In the FIG. 2B example, the security sensor 255 is configured to develop a communication profile for the ICSC 130 (a cyber profile 263N). The cyber profile 263N may include features pertaining to network communication to and/or from the ICSC 130 over time and/or under different operating conditions, as disclosed herein. The cyber profile 263N may include network communication features configured to characterize cyber behavior of the ICSC 130, which features may be monitored during respective time periods (e.g., time windows) (e.g., the cyber profile 263N may include features such as time between messages, mean time between messages, message latency, mean message latency, number of messages per destination, number of message sources, message size, mean message size, number of zero size messages, message data length, mean message data length, maximum data length, data transfer speed, and/or the like). The cyber profile 263N may include communication patterns, which may include communication features captured at particular times and/or while the ICSC 130 is configured to implement particular functionality. The cyber profile 263N may include a cyber model, which may estimate particular characteristics of network communication to and/or from the ICSC 130 under particular conditions (e.g., while the ICSC 130 implements particular functional modules 138). In some implementations, the cyber profile 263N may include and/or correspond to an ML module configured to characterize cyber behavior of the ICSC 130 (e.g., a fuzzy logic cyber anomaly detector). As disclosed above, the security sensor 255 may be configured to monitor network communication pertaining to the ICSC 130, which may include capturing network communication features during respective windows (e.g., sliding windows), comparing the network communication features to the cyber profile 263N (e.g., comparing captured network communication features with corresponding features of the cyber profiles 263N, communication patterns, communication model, and/or the like). The monitoring may further include receiving information pertaining to cyber behavior of the ICSC 130 from one or more other components 102 (e.g., cyber security components 123, perimeter security components 124, and/or the like). The security sensor 255 may be configured to detect anomalies pertaining to ICSC 130 cyber behavior of the ICSC 130 in response to the monitoring, as disclosed herein.

The security sensor 255 may be further configured to develop and/or maintain information pertaining to functionality implemented by the ICSC 130 (e.g., a functional profile 263O). The functional profile 263O may include information pertaining to control system data produced by the ICSC 130, such as sensor data acquired by the ICSC 130, state data produced by the ICSC 130, control decisions determined by the ICSC 130, actuation commands output by the ICSC 130, and/or the like. The functional profile 263O may include control system data produced by the ICSC 130 at particular times, while implementing particular functionality, and/or the like, as disclosed herein. The functional profile 263O may include one or more features of control system data produced by the ICSC 130 (e.g., data ranges, output interval, frequency, and/or the like). The functional profile 263O may further include and/or incorporate physical constraints, as disclosed herein (e.g., constraints pertaining to acquired state data, control system decisions, actuation commands, and/or the like). The security sensor 255 may be further configured to information pertaining to the functional behavior of the ICSC 130 from one or more other components 102, as disclosed herein. The security sensor 255 may be configured to detect anomalies pertaining to functional behavior of the ICSC 130 in response to the monitoring, which may include evaluating control system data produced by the ICSC 130, characterizing by control system data by one or more ML modules, and/or the like, as disclosed herein.

The security sensor 255 may be configured to detect an anomaly pertaining to the ICSC 130 in response to monitoring: service utilization by the ICSC 130, cyber behavior of the ICSC 130, functional behavior of the ICSC 130, and/or the like. The monitoring may include determining evaluating behavior(s) of the ICSC 130 (e.g., comparing the behavior(s) to an ICSC profile 263). The monitoring may further include determining a health metric for the ICSC 130, as disclosed herein. The security sensor 255 may be configured to determine whether the ICSC 130 is subject to attack and/or has been compromised and, in response, generate security commands 165 to isolate the ICSC 130 from the control system 101. The security commands 165 may be further configured to notify other components 102 that the ICSC 130 is to be decoupled from the control system 101, as disclosed herein.

FIG. 3 illustrates another example of a component security device 150. In the FIG. 3 example, the component security device 150 may include computing resources 151, a component manager 160, a security engine 155, and a security sensor 255, as disclosed herein. The component security device 150 may further include a secondary communication interface 176, which may be configured to couple the component security device 150 to a secondary communication network 179, as disclosed herein (not shown in FIG. 3 to avoid obscuring details of the illustrated examples). The security sensor 255 may be configured to detect anomalies pertaining to the ICSC 130 (e.g., monitoring the ICSC 130, as disclosed herein). The security sensor 255 may be configured to develop and/or maintain a profile 263 for the ICSC 130 (e.g., a power profile 263A, cyber profile 263N, functional profile 263O, and/or the like). The monitoring may include comparing behaviors of the ICSC 130 to the profile 263, as disclosed herein.

In the FIG. 3 example, the component security device 150 may further include and/or be communicatively coupled to one or more ICSC sensor devices 355. As used herein, an ICSC sensor device 355 may refer to a sensor device configured to acquire information pertaining to an ICSC 130. An ICSC sensor device 355 may be configured to monitor one or more side channels of an ICSC 130, as disclosed herein (e.g., monitor timing information, power consumption, electromagnetic radiation emissions, radio frequency emissions, acoustic emissions, haptic emissions, heat generation, gradient heat characteristics of respective ICSC elements, and/or the like). Alternatively, or in addition, an ICSC sensor device 355 may be configured to monitor operating conditions of the ICSC 130, such as temperature, temperature of respective ICSC elements (e.g., the temperature of processing resources 132 of the ICSC 130, memory 133, and/or the like), humidity of the ICSC 130 (and/or in a vicinity of the ICSC 130), and/or the like. An ICSC sensor device 355 may include any suitable sensor mechanism, including, but not limited to: a temperature sensor, an electro-optical sensor, an infrared sensor, an electromagnetic radiation sensor, a power meter, a voltage meter, a current meter, a pressure detector, an accelerometer, and/or the like. The security sensor 255 may be communicatively coupled to ICSC sensor devices 355 by any suitable mechanism, including, but not limited to: a direct connection, a component-to-component connection, a sensor interface, a sensor network, the first and/or second coupler 156/166 of the component security device 150, and/or the like. In some implementations, one or more of the ICSC sensor devices 355 may be disposed on and/or within the component security device 150. Alternatively, or in addition, one or more of the ICSC sensor devices 355 may be disposed on and/or within the ICSC 130 (e.g., may include internal sensor devices of the ICSC 130). The security sensor 255 may be communicatively coupled to an internal ICSC sensor device 355 through, inter alia, the CC 136 of the ICSC 130, through CC connectors corresponding to the ICSC sensor device 355, and/or other suitable mechanism. In some aspects, one or more of the ICSC sensor devices 355 may be embodied by the CID 140 and/or support structure 141 thereof (e.g., may include a CID sensor disposed within a support structure 141 of the CID 140, such as a chassis, panel, rack, and/or the like). The security sensor 255 may be communicatively coupled to an ICSC sensor device 355 of the CID 140 through, inter alia, the IC 146 of the CID 140 (e.g., through IC connectors 147 corresponding to the ICSC sensor device 355) and/or other suitable mechanism. In the FIG. 3 example, the component security device 150 may be communicatively coupled to a plurality of ICSC sensor devices 355A-N. The ICSC sensor device 355A may include an infrared sensor directed at the ICSC 130 (e.g., may be capable of remotely measuring the temperature of the ICSC 130 and/or respective elements thereof). The ICSC sensor device 355B may include a vibration sensor, which may be disposed on and/or in physical contact with the ICSC 130. The ICSC sensor device 355N may include an electromagnetic radiation sensor, which may be configured to detect electromagnetic radiation emitted at the CC 136 of the ICSC 130. Although particular examples of ICSC sensor devices 355 are described herein, the disclosure is not limited in this regard and could be configured to incorporate any suitable type of sensor and/or sensing device, as disclosed herein.

The security sensor 255 may utilize the ICSC sensor devices 355 to, inter alia, monitor side channels of the ICSC 130, which may include maintaining a side channel profile 261 of the ICSC 130 comprising characteristics and/or features of respective side channels, as disclosed herein. The security sensor 255 may utilize the ICSC sensor device 355A to monitor a side channel corresponding to heat generated by the ICSC 130 (and/or respective elements thereof), the security sensor 255 may utilize the ICSC sensor device 355B to monitor a side channel corresponding to vibration of the ICSC 130, and so on, including utilizing the ICSC sensor device 355N to monitor a side channel corresponding to electromagnetic radiation emissions of the ICSC 130. The security sensor 255 may be further configured to maintain information pertaining to behaviors of the respective side channels within the side channel profile 261 of the ICSC 130, as disclosed herein. The security sensor 255 may be further configured to compare monitored behaviors of the side channels to features, characteristics, patterns, and/or models of the respective side channels (maintained within the side channel profile 261). The monitoring may further include detecting behaviors indicative of a side channel attack and/or compromise of the ICSC 130 through one or more side channels, as disclosed herein.

The security sensor 255 may be further configured to monitor operating conditions of the ICSC 130, which may include maintaining one or more operating condition profiles 263P-S, each corresponding to a respective characteristic of an ICSC 130 operating condition (e.g., temperature, processor temperature, humidity, and/or the like). The operating condition profiles 263P-S may track operating characteristics over time, during various operating conditions, and/or the like. The operating condition profiles 263P-S may specify operating condition thresholds, patterns, models, and/or the like, as disclosed herein. By way of non-limiting example, the operating condition profile 263P may define temperature thresholds corresponding to nominal operation of the ICSC 130 (e.g., temperatures during particular times and/or while the ICSC 130 implements particular functionality). Exceeding the temperature thresholds may indicate attack and/or compromise of the ICSC 130. The ICSC 130 may be configured to monitor operating conditions of the ICSC 130, compare the monitored operating conditions to operating condition profiles 263P-S, and/or detect anomalies pertaining to the ICSC 130 in response to the comparing. The security sensor 255 may be configured to issue a security command 165 configured to isolate the ICSC 130 from the control system 101 in response to detecting anomalous operating conditions.

Figure 4:
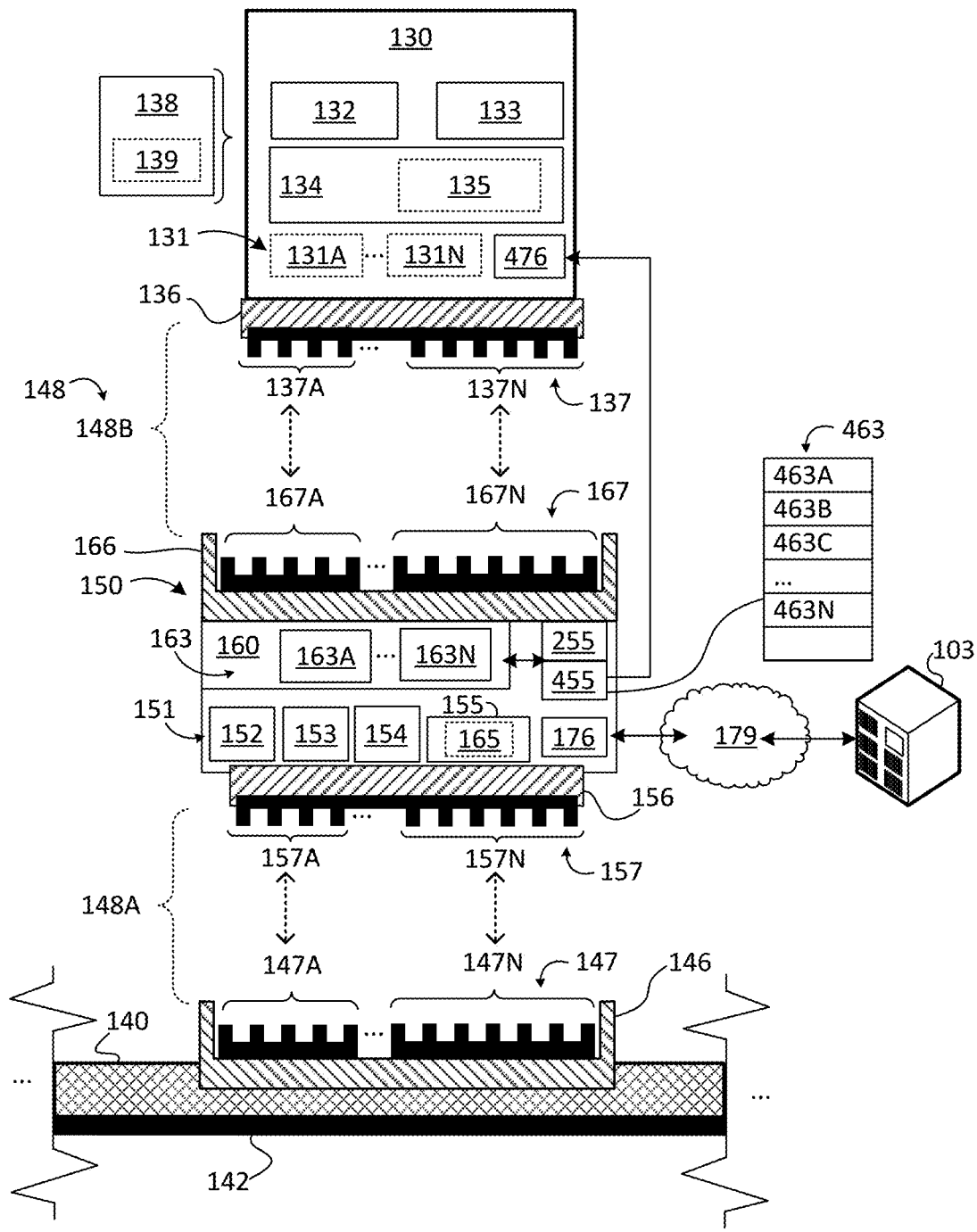
FIG. 4 illustrates an example of a component security device that can implement forensics functionality.

FIG. 4 illustrates another example of a device that can implement aspects of control system security, as disclosed herein. In the FIG. 4 example, the component security device 150 may include computing resources 151, a component manager 160, a security engine 155, and a security sensor 255, as disclosed herein. Although not depicted in FIG. 4 to avoid obscuring details of the illustrated examples, the component security device 150 may further include and/or be communicatively coupled to one or more ICSC sensor devices 355 configured to monitor operating conditions of the ICSC 130. The component security device 150 may further include a secondary communication interface 176, which may be configured to couple the component security device 150 to a secondary communication network 179, as disclosed herein.

In the FIG. 4 example, the component security device 150 includes and/or is coupled to a forensic module 455. The forensic module 455 may be configured to capture diagnostic data 463 pertaining to operation of the ICSC 130. The diagnostic data 463 may include any suitable information pertaining to the ICSC 130 including, but not limited to: power diagnostic data 463A indicating power consumption of the ICSC 130, functional diagnostic data 463B comprising information pertaining to functionality implemented by the ICSC 130 (e.g., information pertaining to respective functional modules 138 of the ICSC 130, which may be configured to implement functionality of a CPCE 104, such as input functionality, control functionality, output functionality, communication functionality, and/or the like), configuration diagnostic data 463C comprising information pertaining to a configuration of the ICSC 130 and/or functional modules 138 thereof (e.g., ICSC data 135, ICSC firmware, FM configuration(s) 139, and/or the like), communication diagnostic data 463N comprising information pertaining to network communication of the ICSC 130 (e.g., network communication characteristics, features, patterns, models, communication interfaces 131, and/or the like), and so on.

The forensic module 455 may be configured to acquire diagnostic data 463 by and/or through the CC 136 of the ICSC 130 (through respective CC connectors 137). Alternatively, or in addition, the forensic module 455 may be configured to request diagnostic data 463 through communication interface(s) 131 of the ICSC 130. The forensic module 455 may be configured to access diagnostic data 463 in accordance with communication and/or diagnostic protocols of the ICSC 130. The forensic module 455 may be configured to access contents of computing resources of the ICSC 130 (e.g., processing resources 132, memory 133, persistent storage 134, and/or the like). The forensic module 455 may be configured to acquire diagnostic data 463 through a secondary communication interface of the ICSC 130 (e.g., a diagnostic interface 476 of the ICSC 130).

In some implementations, the forensic module 455 is configured to acquire diagnostic data 463 while the ICSC 130 is isolated from the control system 101 (e.g., in response to the security sensor 255 detecting an anomaly pertaining to the ICSC 130). In these implementations, the mitigation operations implemented by the security engine 155 may include coupling the ICSC 130 to power supply services of the CID 140, while isolating the ICSC 130 from the control system 101. The security engine 155 may be configured to couple CC power connectors 137 of the ICSC 130 to power supplied by and/or through the CID 140 while disconnecting IC communication connectors 147N therefrom. The ICSC 130 may, therefore, be capable of responding to requests for diagnostic data 463 and be prevented from injecting malicious control system data through the CID network 142.

The forensic module 455 may be further configured to provide access to the diagnostic data 463 to components 102 of the control system 101. The forensic module 455 may provide access to the diagnostic data 463 through the CPS network 122 (by use of communication interface(s) of the component security device 150, as disclosed herein). Alternatively, or in addition, the forensic module 455 may be configured to provide access to the diagnostic data 463 through a secondary communication interface 176 (and/or secondary communication network 179). As illustrated in FIG. 4, the forensic module 455 may be configured to provide access to diagnostic data 463 pertaining to the ICSC 130 to a terminal 103 coupled to the secondary communication network 179. Providing access to the diagnostic data 463 may further include processing the diagnostic data 463 (e.g., aggregating, grouping, filtering, signatures, and/or other processing operations on the diagnostic data 463).

The forensic module 455 may implement an application programming interface (API) by which components 102 may access diagnostic data 463 of the ICSC 130. The forensics API may provide for specifying diagnostic data 463 to retrieve from the ICSC 130 (e.g., may request a specified portion of the firmware of the ICSC 130, an FM configuration 139 of a particular functional module 138, and/or the like). The forensics API may further provide for specifying processing of the diagnostic data 463 (e.g., specify aggregations, groups, and/or other processing operations). The forensics API may provide for accessing signatures of ICSC data 135 (e.g., firmware signatures, FM configuration signatures, and/or the like). In some implementations, the forensics API may be further configured to provide access to a profile 263 of the ICSC 130 (e.g., a power profile 263A, cyber profiles 263N, operating condition profiles 263P-S, and/or the like). The forensics API may provide access to thresholds, patterns, models, and/or other information pertaining to characteristics monitored by the security sensor 255. The forensics API may also provide access to monitoring data that resulted in detection of anomalies pertaining to the ICSC 130 (e.g., anomalous power consumption, anomalous network communication, anomalous operating conditions, and/or the like).

The forensic module 455 may be further configured to implement an API by which the configuration of the ICSC 130 may be modified and/or restored (a recovery API). The forensic module 455 may be configured to service request submitted to the recovery API. The recovery API may provide for pushing configuration data to the ICSC 130, which may include, but is not limited to: ICSC data 135, firmware, configuration data, computer-readable instructions, FM configuration(s) 139 of functional modules 138 implemented by the ICSC 130, and/or the like. The recovery API may provide for configuring the ICSC 130 to implement modified ICSC data 135 (e.g., flash firmware of the ICSC 130 and/or the like). The recovery API may be further configured to provide for restarting the ICSC 130 (e.g., power cycling the ICSC 130, restarting the ICSC 130, and/or the like). The forensic module 455 may be configured to reimage the ICSC 130, which may include obtaining valid ICSC data 135 for the ICSC 130 (e.g., from a supervisory computing device, an RTU, the terminal 103, and/or the like), transferring the valid ICSC data 135 to the ICSC 130, and configuring the ICSC 130 to implement the valid ICSC data 135.

The forensic module 455 may be further configured to determine whether the ICSC 130 is suitable to be coupled to the control system 101 (e.g., resume implementing functionality of one or more CPCE 104). The forensic module 455 may be configured to verify a configuration of the ICSC 130 (e.g., verify that ICSC data 135 thereof corresponds to a valid, non-compromised configuration of the ICSC 130). Alternatively, or in addition, the forensic module 455 may be configured to determine whether the ICSC 130 is suitable to be reconnected to the control system 101 in response to system command(s) and/or security commands 165 from higher-level components 102 (e.g., supervisory computing device, RTUs, the terminal 103, and/or the like). To reconnect the ICSC 130, the security engine 155 may configure the component manager 160 to couple the ICSC 130 to the CID 140 (e.g., couple the ICSC 130 to power supply services, communication services, and/or the like).

Figure 5A:
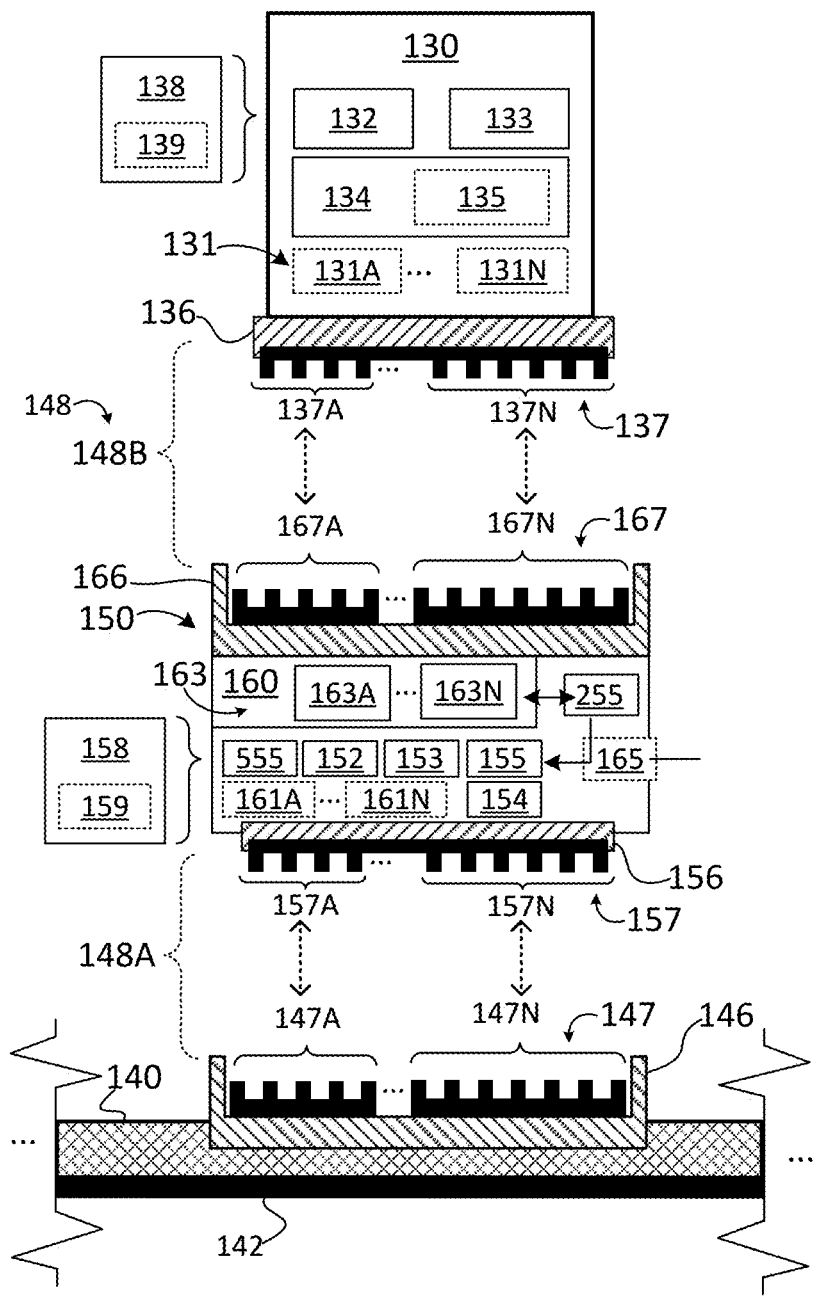
FIG. 5A illustrates an example of a component security device that can implement aspects of control system security with failover.

FIG. 5A illustrates another example of a component security device 150. The illustrated component security device 150 may include computing resources 151, a component manager 160, and a security engine 155, as disclosed herein. The component security device 150 may further include a security sensor 255 configured to, inter alia, detect anomalies pertaining to the ICSC 130 and/or issue security commands 165 to configure the security engine 155 to implement one or more mitigation operations (e.g., isolate the ICSC 130 from the control system 101). Alternatively, or in addition, the security engine 155 may be configured to receive security commands 165 from one or more other components 102 of the cyber-physical system 100, as disclosed herein. Although not depicted in FIG. 5A to avoid obscuring details of the illustrated examples, the component security device 150 may further include and/or be communicatively coupled to one or more ICSC sensor devices 355 configured to monitor operating conditions of the ICSC 130, a forensic module 455, and/or a secondary communication interface 176 configured to couple the component security device 150 to a secondary communication network 179, as disclosed herein.

In the FIG. 5A example, the component security device may further include a failover engine 555, which may be configured to implement failover functionality pertaining to the ICSC 130. As disclosed herein, "failover functionality" refers to functionality configured to replace functionality implemented by the ICSC 130, as disclosed herein. The failover engine 555 may be embodied by computing resources of the component security device 150 (e.g., processing resources 152, memory 153, persistent storage resources 154, and/or the like). The failover engine 555 may be embodied by instructions stored on non-transitory storage media, the instructions configured to cause a processor of the component security device 150 to implement failover functionality, as disclosed herein. Alternatively, or in addition, the failover engine 555 may be configured to implement failover functionality by use of failover hardware components, as disclosed in further detail herein.

As disclosed above, functionality implemented by an ICSC 130 may be represented, embodied, and/or implemented by a functional module 138 of the ICSC 130. As disclosed above, a functional module 138 of an ICSC 130 may be embodied by hardware components of the ICSC 130. Alternatively, or in addition, the functional module 138 may be embodied by computer-readable data and/or instructions maintained within non-transitory storage (e.g., persistent storage 134 of the ICSC 130). The functional module 138 may be configured to implement functionality of a CPCE 104 in accordance with an FM configuration 139, as disclosed herein. The functional module 138 may embody any functionality pertaining to implementation of a control system 101 and/or CPCE 104, including, but not limited to: input functionality (e.g., acquire and/or produce state data pertaining to a PPV 108 by use of one or more acquisition devices 114); control functionality (e.g., determine control decisions in accordance with a control function and based on the acquired state of the PPV 108); output functionality (e.g., implement control decisions by use of one or more actuation devices 116); communication functionality; and/or the like.

The security engine 155 may be configured to implement mitigation actions in response to, inter alia, security commands 165 indicating that the ICSC 130 is under attack and/or has been compromised. The mitigation actions may include isolating the ICSC 130 from the control system 101, as disclosed herein. The mitigation actions may, therefore, result in removing functionality implemented by the ICSC 130 from the control system 101. In the FIG. 5A example, the mitigation actions implemented by the security engine 155 may further include implementing failover functionality configured to replace functionality implemented by the ICSC 130 (replace the functional module 138 of the ICSC 130). The failover functionality implemented by the component security device 150 may enable the control system 101 to continue operation while the ICSC 130 is isolated therefrom.

The failover engine 555 may include and/or implement a failover module 158, which may be configured to correspond to the functional module 138 of the ICSC 130. The failover module 158 may include, embody, and/or be configured to replace functionality implemented by the functional module 138. The failover module 158 may be configured to implement failover functionality in accordance with a failover configuration 159, which may be maintained within non-transitory storage (e.g., persistent storage resources 154 of the component security device 150). The failover configuration 159 may correspond to the FM configuration 139 of the functional module 138 implemented by the ICSC 130. In some implementations, the component security device 150 may be configured to copy and/or clone the functional module 138 (and/or FM configuration 139 thereof) by, inter alia, interrogation of the ICSC 130. Alternatively, or in addition, the failover module 158 and/or failover configuration 159 may be configured by an operator and/or other component 102 (e.g., a supervisory computing device, an RTU, the terminal 103, and/or the like).

The mitigation actions implemented by the security engine 155 may include isolating the ICSC 130 from the control system 101, as disclosed herein. The mitigation actions (e.g., isolating the ICSC 130) may further include implementing failover functionality corresponding to the ICSC 130. Implementing the failover functionality may include instantiating a failover module 158 within computing resources of the component security device 150 and/or configuring the failover module 158 to implement functionality corresponding to the functional module 138 of the ICSC 130. The instantiating may include loading instructions, settings, and/or other information pertaining to the failover module 158 (e.g., failover configuration 159). The instantiating may include loading the failover module 158 and/or failover configuration 159 into memory 153, tasking processing resources 152 with implementing the failover module 158, and/or the like. In some implementations, the instantiating may further include configuring the failover module 158 and/or failover configuration 159 in accordance with a current state of the functionality implemented by the ICSC 130. The failover engine 555 may be configured to populate the failover module 158 and/or failover configuration 159 with settings, configuration data, and/or other information pertaining to functionality implemented by the ICSC 130. The failover engine 555 may be configured to determine processing operations involved in input functionality implemented by the ICSC 130, control function parameters and/or settings involved in control function implemented by the ICSC 130, and/or the like. Implementing the failover functionality may further include coupling the failover module 158 to the control system 101, which may include coupling the failover module 158 to one or more electronic communication networks (e.g., by use of the communication manager 163N). Implementing the failover functionality may further include establishing communication interfaces 161 for the failover module 158 (e.g., communication interfaces 161A-N corresponding to communication interfaces 131A-N of the ICSC 130). The communication interfaces 161 may be configured to couple the failover module 158 to other components 102 involved in implementation of one or more control system tasks, e.g., may couple the failover module 158 to one or more acquisition devices 114, input functionality (e.g., ICSC 130A), control functionality (e.g., ICSC 130B), output functionality (ICSC 130C), actuation devices 116, and/or the like.

Figure 5B:
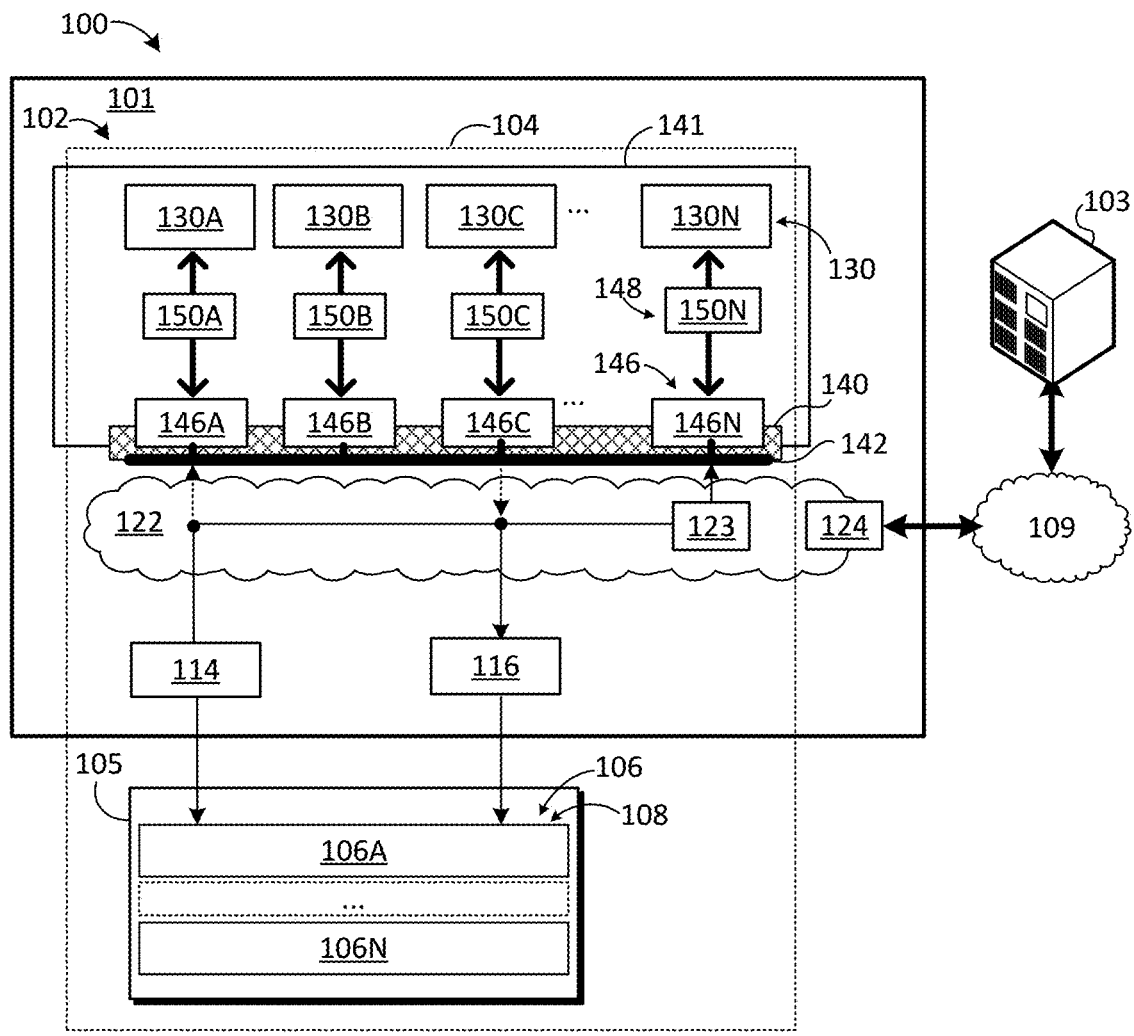
FIG. 5B illustrates an example of a system that includes a component security device that can implement aspects of control system security with failover.

As disclosed above, the failover engine 555 may be configured to implement functionality corresponding to functionality implemented by the ICSC 130 coupled thereto. The component security device 150 (and/or failover engine 555 thereof) may, therefore, be configured in accordance with particular ICSC 130. Referring to FIG. 5B, the cyber-physical system 100 may include a plurality of component security devices 150A-N, each coupled to a respective ICSC 130A-N. In the FIG. 5B example, the component security device 150A is configured to implement failover functionality corresponding to the input functionality implemented by the ICSC 130A, the component security device 150B is configured to implement failover functionality corresponding to the control functionality implemented by the ICSC 130B, the component security device 150C is configured to implement failover functionality corresponding to the output functionality implemented by the ICSC 130C; the component security device 150N is configured to implement failover functionality corresponding to the communication functionality implemented by the ICSC 130N, and so on. The component security device 150A may include a failover module 158 corresponding to the functional module 138 of the ICSC 130A (configured to implement input functionality for the CPCE 104), the component security device 150B may include a failover module 158 corresponding to the functional module 138 of the ICSC 130B (configured to implement control functionality for the CPCE 104), the component security device 150C may include a failover module 158 corresponding to the functional module 138 of the ICSC 130C, and so on, with component security device 150N comprising a failover module 158 corresponding to the functional module 138 and/or FM configuration 139 of the ICSC 130N. The failover configurations 159 of the component security devices 150A-N may correspond to FM configurations of the ICSC 130A-N, as disclosed herein.

Referring to FIG. 5A, the component security device 150 may further include a forensic module 455, as disclosed herein (not shown in FIG. 5A to avoid obscuring details of the illustrated examples). The forensic module 455 may be configured to provide access to diagnostic data 463 pertaining to the ICSC 130 while the ICSC 130 is isolated from the control system 101, and/or while the failover module 158 is configured to implement failover functionality configured to replace functionality implemented by the ICSC 130, as disclosed herein. The security engine 155 may be further configured to reconnect the ICSC 130 to the control system 101. Reconnecting the ICSC 130 may include coupling the ICSC 130 to services provided by and/or through the CID 140, as disclosed herein. Reconnecting the ICSC 130 may further include transferring information pertaining to failover functionality implemented by the component security device 150 (e.g., a state of one or more PPV 108, control function parameters and/or settings, and/or the like). Alternatively, or in addition, reconnecting the ICSC 130 may include configuring the ICSC 130 to operate in accordance with ICSC data 135 thereof.

Figure 5C:
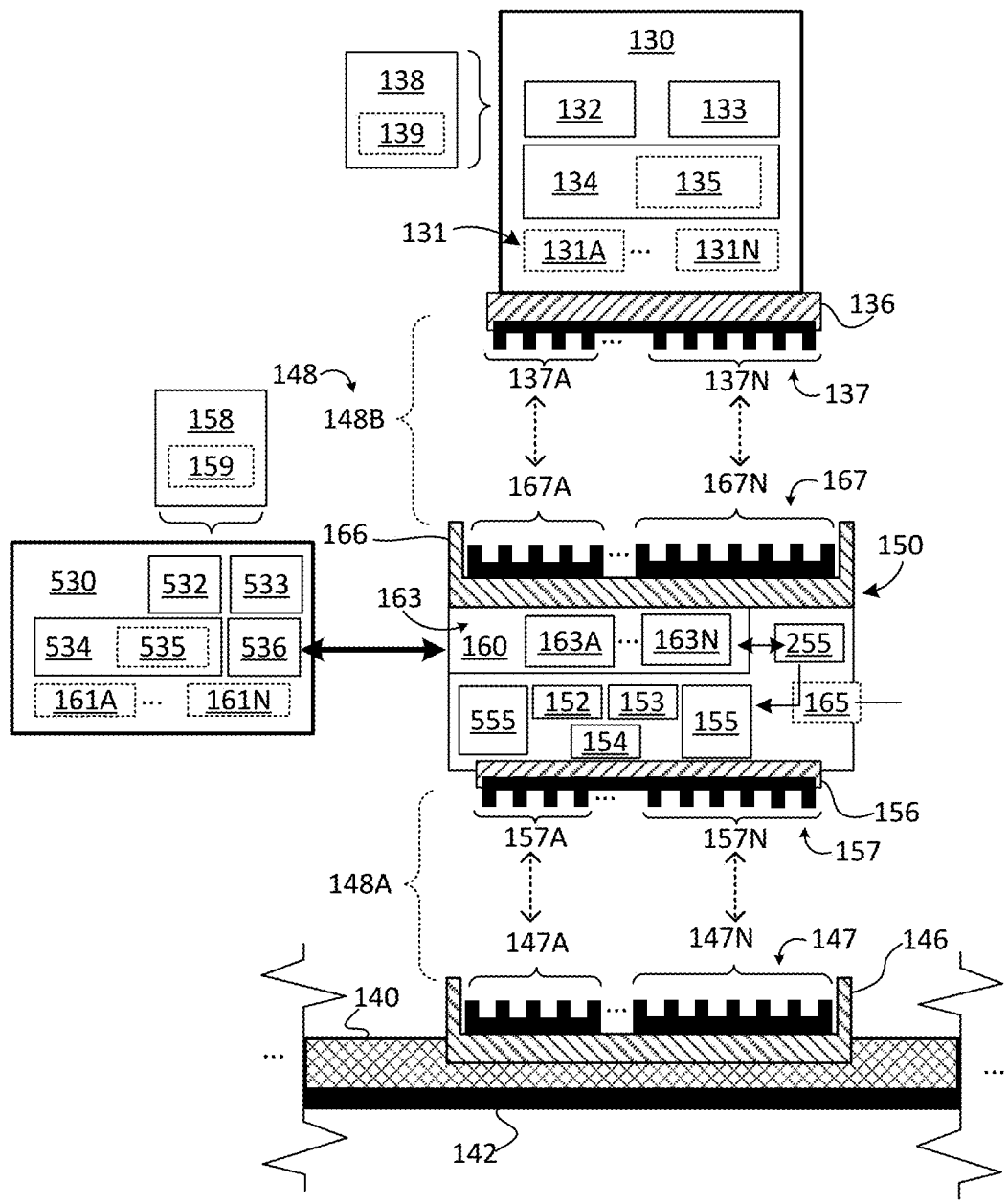
FIG. 5C illustrates an example of a component security device that includes failover hardware.

FIG. 5C illustrates another example of a component security device 150 having failover capabilities, as disclosed herein. The component security device 150 may include computing resources 151, a component manager 160, a security engine 155, and/or a security sensor 255, as disclosed herein. Although not depicted in FIG. 5A to avoid obscuring details of the illustrated examples, the component security device 150 may further include and/or be communicatively coupled to one or more ICSC sensor devices 355 configured to monitor operating conditions of the ICSC 130, a forensic module 455, and/or a secondary communication interface 176 configured to couple the component security device 150 to a secondary communication network 179, as disclosed herein.

In the FIG. 5C example, the component security device 150 may further include and/or be coupled to a failover ICSC 530. The failover ICSC 530 may include hardware elements, such as processing resources 532, memory 533, persistent storage 534, and/or the like. The failover ICSC 530 may include a computing device, as disclosed herein. The failover ICSC 530 may further include a failover coupler (FC) 536, which may be configured to physically and/or electrically couple the failover ICSC 530 to the component manager 160 of the component security device 150. The component manager 160 may be configured to selectively couple the failover ICSC 530 to services provided by and/or through the CID 140. The power manager 163A may be configured to selectively couple the failover ICSC 530 to power supplied through respective IC power connectors 147A, the communication manager 163N may be configured to selectively couple the failover ICSC 530 to communication services supplied through respective IC communication connectors 147N, and so on. The failover ICSC 530 may include, embody, and/or be configured to implement one or more failover modules 158, as disclosed herein.

The security engine 155 may be configured to implement mitigation actions in response to security commands 165 pertaining to the ICSC 130 (e.g., security commands 165 generated by the security sensor 255 and/or received from one or more other components 102). The mitigation actions may include isolating the ICSC 130 from the control system 101, as disclosed herein. The mitigation actions may further include failover actions to replace functionality implemented by the ICSC 130. Implementing the failover functionality may include the failover engine 555 configuring the failover ICSC 530 to replace functionality implemented by the ICSC 130. Implementing the failover functionality may include coupling the failover ICSC 530 to services provided by and/or through the CID 140. Implementing the failover functionality may further include configuring the failover ICSC 530 to implement failover modules 158 corresponding to functional modules 138 of the ICSC 130. The ICSC 530 may, therefore, be configured in accordance with particular ICSC 130 (e.g., may be configured to include failover ICSC 530 capable of implementing failover functionality corresponding to respective ICSC 130). In the FIG. 5C example, the failover engine 555 may be configured to implement failover functionality by, inter alia, selectively coupling the failover ICSC 530 to the control system 101 (e.g., selectively coupling the FC 536 to the IC 146, as disclosed herein). Coupling the failover ICSC 530 may further include coupling the ICSC 530 to one or more communication interfaces 161 (e.g., communication interfaces 161A-N corresponding to communication interfaces 131A-N of the ICSC 130).

Figure 5D:
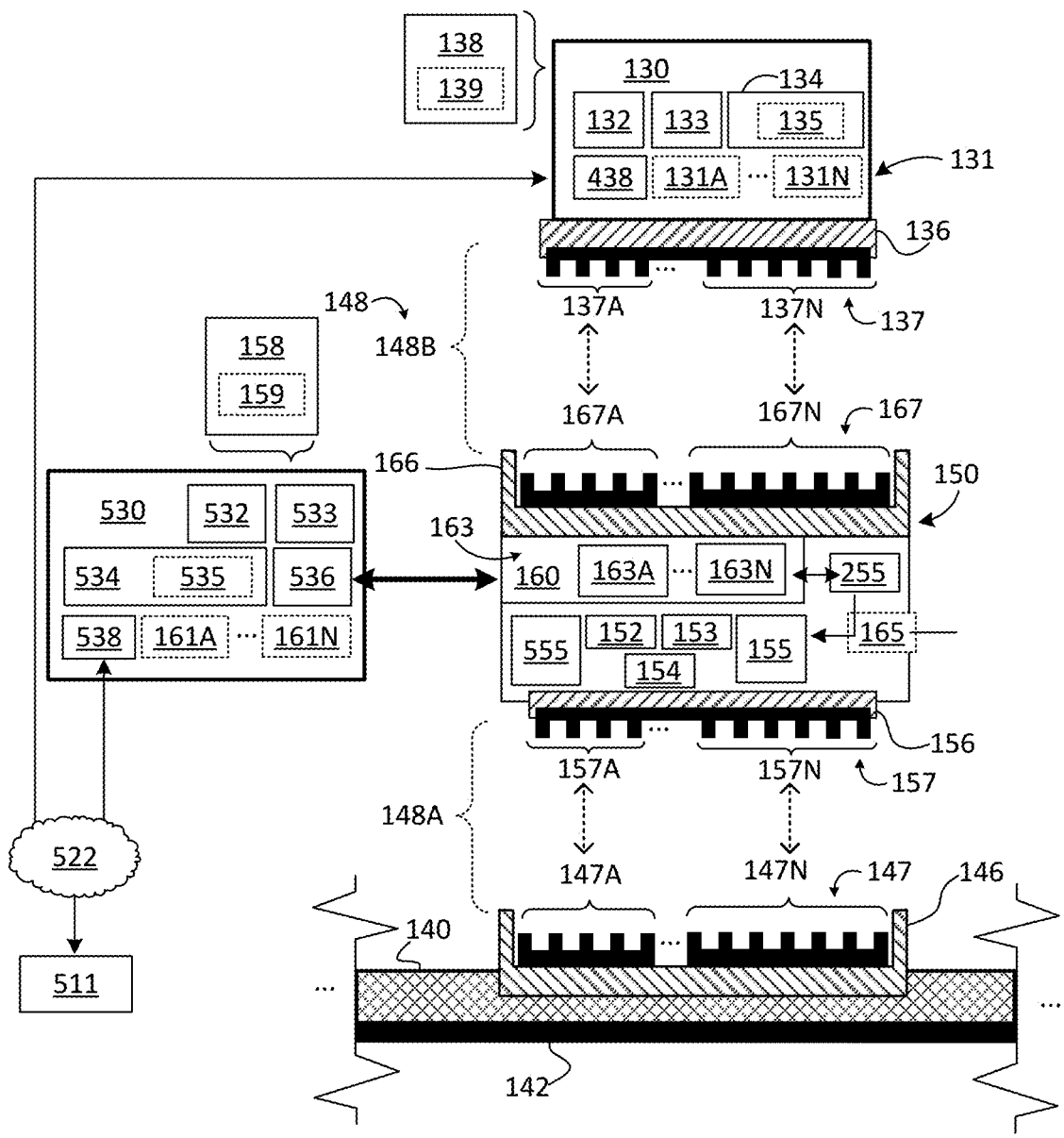
FIG. 5D illustrates another example of a component security device that includes failover hardware, as disclosed herein.

FIG. 5D illustrates another example of a component security device 150 having failover capabilities, as disclosed herein. The component security device 150 may include computing resources 151, a component manager 160, a security engine 155, a security sensor 255, a failover engine 555, and a failover ICSC 530, as disclosed herein. Although not depicted in FIG. 5D to avoid obscuring details of the illustrated examples, the component security device 150 may further include and/or be communicatively coupled to one or more ICSC sensor devices 355 configured to monitor operating conditions of the ICSC 130, a forensic module 455, and/or a secondary communication interface 176 configured to couple the component security device 150 to a secondary communication network 179, as disclosed herein.

The security engine 155 may be configured to implement mitigation actions pertaining to the ICSC 130, which may include isolating the ICSC 130 from the control system 101. The mitigation actions may further include the failover engine 555 implementing failover actions to, inter alia, replace functionality implemented by the ICSC 130. In the FIG. 5D example, the failover engine 555 may be configured to implement failover actions by use of, inter alia, a failover ICSC 530, as disclosed herein.

The failover ICSC 530 may include hardware elements configured to implement functionality of the ICSC 130. In the FIG. 5D example, the ICSC 130 may be coupled to a device 511 (e.g., an acquisition device 114, actuation device 116, and/or the like). The ICSC 130 may include a communication interface 131A configured to couple the ICSC 130 to the device 511 through, inter alia, a device network 522 (e.g., an analog network, a sensor network, an actuator network, a device-to-device connection, and/or the like). The ICSC 130 may be configured to interface with the device 511 and/or device network 522 by use of, inter alia, a device network interface 438. The failover ICSC 530 may be configured to replace functionality implemented by the ICSC 130, which may include interfacing with the device 511. The failover ICSC 530 may, therefore, include a communication interface 161A configured to selectively couple the failover ICSC 530 to the device 511 through, inter alia, the device network 522. The failover ICSC 530 may be configured to interface with the device 511 and/or device network 522 by use of, inter alia, a device network interface 538 (e.g., a device interface, an analog interface, and/or the like). Although particular examples of hardware elements configured to implement functionality of an ICSC 130 are described herein, the disclosure is not limited in this regard and could be adapted for use with any suitable mechanisms for implementing functionality of a control system (e.g., I/O hardware elements, processing hardware elements, control hardware elements, and/or the like).

Figure 5E:
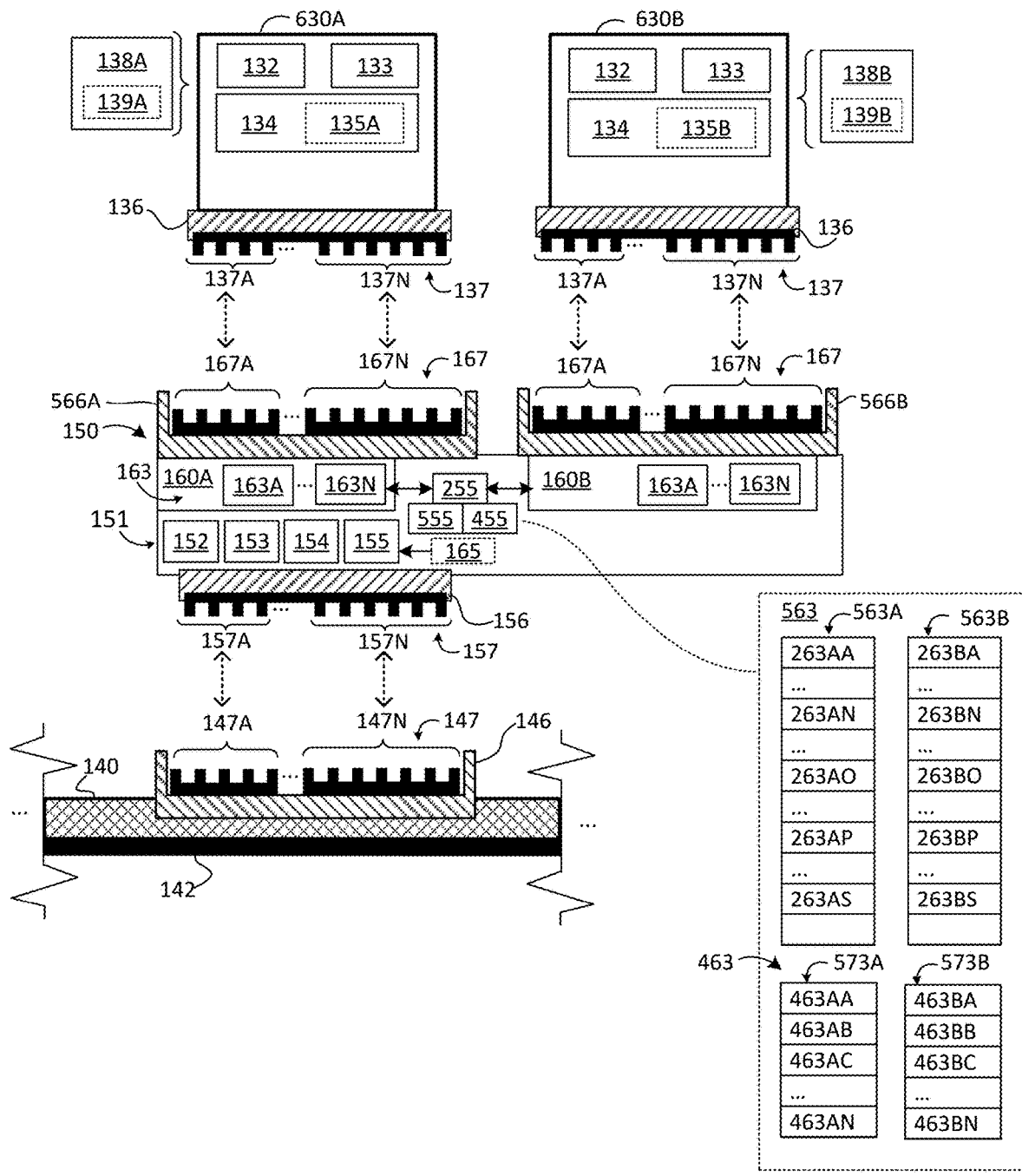
FIG. 5E illustrates an example of a component security device having multiple component interfaces.

FIG. 5E illustrates another example of a component security device 150 having failover capabilities, as disclosed herein. The component security device 150 may include computing resources 151, a component manager 160, a security engine 155, a security sensor 255, and a failover engine 555, as disclosed herein. Although not depicted in FIG. 5D to avoid obscuring details of the illustrated examples, the component security device 150 may further include and/or be communicatively coupled to one or more ICSC sensor devices 355, a forensic module 455, and/or a secondary communication interface 176 configured to couple the component security device 150 to a secondary communication network 179, as disclosed herein.

The component security device 150 may be configured to be physically and/or electrically coupled to a CID 140, as disclosed herein (e.g., may include a first coupler 156 configured to couple with an IC 146 of the CID 140 and/or respective IC connectors 147 thereof). In the FIG. 5E example, the component security device 150 may further include a first ICSC coupler 566A and a second ICSC coupler 566B. The first ICSC coupler 566A may be configured to couple with a first ICSC 630A and the second ICSC coupler 566B may be configured to couple with a second ICSC 630B. The first and second ICSC 630A/630B may include respective ICSC 130, as disclosed herein (e.g., may include respective computing resources, such as processing resources 132, memory 133, persistent storage 134, ICSC data 135, CC 136 comprising respective CC connectors 137, and/or the like). The component security device 150 may include a first component manager 160A configured to selectively couple the first ICSC 630A to the CID 140 and a second component manager 160B configured to selectively couple the second ICSC 630B to the CID 140, as disclosed herein.

The first and second ICSC 630A/630B may be configured to implement same and/or similar functionality (e.g., may be configured to implement same or similar input functionality, control functionality, output functionality, and/or communication functionality for a same or similar CPCE 104). The first ICSC 630A may include, embody, and/or implement a first functional module 138A (in accordance with a first FM configuration 139A), and the second ICSC 630B may include, embody, and/or implement a second functional module 138B (in accordance with a second FM configuration 139B). The first functional module 138A may be configured to correspond with the second functional module 138B, and the first FM configuration 139A may be configured to correspond with the second FM configuration 139B (and/or vice versa). The failover engine 555 may be configured to switch between the first and second ICSC 630A/630B, which may include isolating one of the first or second ICSC 630A/630B from the control system 101, and coupling the other one of the first or second ICSC 630A/630B to the control system 101 (by use of the first and/or second CIC managers 160A/160B, respectively).

The security engine 155 may be configured to implement mitigation actions pertaining to the ICSC 630A and/or 630B in response to, inter alia, security commands 165, as disclosed herein. In response to a security command 165 pertaining to the active ICSC 630A or 630B, the security engine 155 may be configured to switch between the ICSC 630A and 630B. As used herein, the "active" ICSC 630A or 630B refers to the ICSC 630A/630B that is coupled to the control system 101. Switching from the first ICSC 630A to the second ICSC 630B may include isolating the first ICSC 630A from the control system 101 and coupling the second ICSC 630B to the control system 101. Switching from the second ICSC 630B to the first ICSC 630B may include isolating the second ICSC 630B from the control system 101 and coupling the first ICSC 630A to the control system 101. Switching may further include configuring the active ICSC 630A/630B to implement functionality of a CPCE 104, as disclosed herein (e.g., transferring FM configuration 139A/139B between the ICSC 630A/630B, and/or the like). In some implements, the security engine 155 may determine that both the first and second ICSC 630A and 630B are compromised (in response to one or more security commands 165) and, in response, may configure the security engine 155 to isolate both ICSC 630A and 630B from the control system, as disclosed herein.

The security sensor 255 may be configured to monitor one or more of the first ICSC 630A and the second ICSC 630B. The security sensor 255 may be configured to monitor the first ICSC 630A by use of, inter alia, the first component manager 160A, and monitor the second ICSC 630B by use of, inter alia, the second component manager 160B. The security sensor 255 may be configured to monitor utilization of services by the first and/or second ICSC 630A/630B, may be configured to monitor a cyber behavior of the first and/or second ICSC 630B/630B, may be configured to monitor a functional behavior of the first and/or second ICSC 630A/630B, and so on. Although not depicted in FIG. 5E to avoid obscuring details of the illustrated examples, the security sensor 255 may be further configured to monitor operating conditions of respective ICSC 630A/630B by use of one or more ICSC sensor devices 355, as disclosed herein. The component security device 150 may be further configured to maintain metadata 563 pertaining to the first and/or second ICSC 630A/630B. The security sensor 255 may be configured to maintain a first profile 563A for the first ICSC 630A and a second profile 563B for the second ICSC 630B, as disclosed herein. The first profile 563A may include a power consumption profile 263AA of the first ICSC 630A, a cyber profile 263AN of the first ICSC 630A, and/or the like. The first profile 563A may further include a functional profile 263AO and/or operating condition profiles 263AP-AS of the first ICSC 630A. The second profile 563B may include a power consumption profile 263BA of the second ICSC 630B, a cyber profile 263BN of the second ICSC 630B, and/or the like. The second profile 563B may further include a functional profile 263BO and/or operating condition profiles 263BP-BS of the second ICSC 630B. The security sensor 255 may be configured to monitor one or more of the first and second ICSC 630A/630B, which may include comparing and/or evaluating behavior(s) of the ICSC 630A/630B to profiles 563A/563B, as disclosed herein. The security sensor 255 may be further configured to determine health metrics for the first and/or second ICSC 630A/630B, as disclosed herein.

Figure 6:
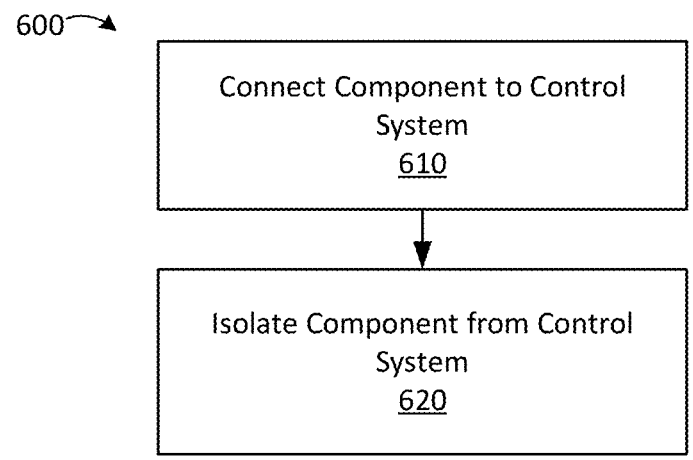
FIG. 6. illustrates a first example flow diagram depicting operations for control system security, as disclosed herein.
Figure 7:
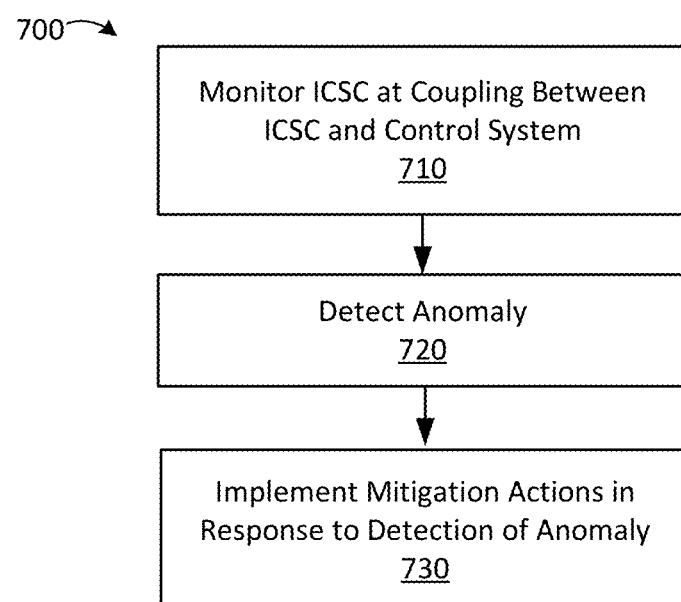
FIG. 7. illustrates a second example flow diagram depicting operations for control system security, as disclosed herein.

Example methods are described in this section with reference to the flowcharts and flow diagrams of FIGS. 6 and 7. These descriptions reference components, entities, and other aspects depicted in FIGS. 1A through 5E by way of example only. The flow diagram 600 includes blocks 610 and 620. In some implementations, a component security device 150 (and/or component thereof) can perform one or more operations of the flow diagram 600 (and/or operations of the other flow diagrams described herein).

FIG. 6 is a flow diagram 600 illustrating a first example of a method for control system security. The flow diagram 600 includes blocks 610 and 620. At 610, a component security device 150 connects an ICSC 130 to a control system 101, as disclosed herein. The component security device 150 may be deployed at and/or within a CIC 148 between the ICSC 130 and control system infrastructure, such as a CID 140 and/or an IC 146 thereof (e.g., a backplane, bus, and/or the like). The component security device 150 may be deployed between physical and/or electrical connectors of the ICSC 130 (CC connectors 137) and physical and/or electrical connectors of the CID 140 (e.g., IC connectors 147). The component security device 150 may be configured to couple the ISCS 130 to power, communication, and/or other services provided by and/or through the control system infrastructure. In some implementations, the component security device 150 is further configured to monitor the ICSC 130, as disclosed herein.

At 620, the component security device 150 may be configured to isolate the ISCS 130 from the control system 101. The ICSC 130 may be isolated from the control system 101 in response to detection of an anomaly pertaining to the ICSC 130, a security command 165, and/or the like. Isolating the ICSC 130 may include disconnecting the ICSC 130 from the control system 101 by, inter alia, interrupting physical and/or electrical connections between the ICSC 130 and control system infrastructure (e.g., a CID 140 and/or an IC 146 thereof). Isolating the ICSC 130 may include blocking communication to and/or from the ICSC 130 while supplying power to the ICSC 130. Blocking communication may include modifying (e.g., blocking) communication of the ICSC 130 on one or more: electronic communication networks (e.g., CID network 142, CPS network 122, device-to-device networks, and/or the like), communication interfaces 131, communication channels, downstream communication channels, upstream communication channels, incoming network communication, outbound network communication, and/or the like.

Isolating the ICSC 130 at 620 may include disconnecting communication interfaces 131 by which the ICSC 130 implements functionality of the control system 101 (e.g., implements functionality of a CPCE 104). In some embodiments, isolating the ICSC 130 may include switching between first/second ICSC 630A/630B, as disclosed herein. In some embodiments, isolating the ICSC 130 may further include maintaining selected communication interfaces 131 of the ICSC 130. The selected communication interfaces 131 may enable the component security device 150 (and/or other components 102 of the cyber-physical system 100) to implement forensic operations on the ICSC 130 (e.g., interrogate the ICSC 130), recover from attack and/or compromise of the ICSC 130, and/or the like, as disclosed herein. In some embodiments, isolating the ICSC 130 may further include implementing failover operations to, inter alia, replace functionality of the ICSC 130, as disclosed herein.

In some implementations, the component security device 150 may be configured to reconnect the ICSC 130 to the control system 101. The ICSC 130 may be reconnected in response to a security command 165 indicating that the ICSC 130 is suitable for use within the control system 101 (and/or otherwise determining that the ICSC 130 can be recoupled to the control system 101). Reconnecting the ICSC 130 may include coupling the ICSC 130 to services provided by and/or through the CID 140 (e.g., coupling CC connectors 137 to corresponding IC connectors 147) at 610.

FIG. 7 illustrates an example flow diagram 700 of a second method for control system security. The flow diagram 700 includes blocks 710 through 730. At 710, a component security device 150 monitors an ICSC 130 at a coupling between the ICSC 130 and the control system 101. The component security device 150 may be coupled between the ICSC 130 and the control system 101, as disclosed herein. The component security device 150 may be configured to monitor the utilization of service(s) provided by and/or through a CIC 148 between the ICSC 130 and the CID 140 (and/or the IC 146 thereof). At 710, the component security device 150 may be configured to monitor power consumption by the ICSC 130, cyber behavior of the ICSC 130, and/or the like.

In some implementations, the component security device is further configured to monitor functional behavior of the ICSC 130 at 710, which may include capturing, inspecting, and/or evaluating control system data produced by the ICSC 130. The control system data may include, but is not limited to: state data pertaining to one or more PPV 108 determined by input functionality implemented by the ICSC 130, control decisions determined by control functionality implemented by the ICSC 130, actuation commands determined by output functionality implemented by the ICSC 130, and/or the like.

In some aspects, the component security device 150 may be configured to monitor operating conditions of the ICSC 130 and/or respective elements of the ICSC 130 by use of one or more ICSC sensor devices 355 at 710. The component security device 150 may be configured to develop and/or maintain a profile 263 of the ICSC 130, as disclosed herein (e.g., a power profile 263A, a cyber profile 263N, a functional profile 263O, one or more operating condition profiles 263P-S, and/or the like). In some implementations, the component security device 150 may be configured to assign a health metric to the ICSC 130 at 710. The health metric may include a combination of health metrics corresponding to respective behaviors and/or operating conditions of the ICSC 130.

At 720, the component security device 150 may detect an anomaly pertaining to the ICSC 130. The anomaly may be detected in response to monitoring the ICSC 130 at 710. At 720, the component security device 150 may determine that the ICSC 130 is subject to cyberattack and/or compromise, as disclosed herein. The component security device 150 may be further configured to generate one or more security commands 165 in response to detecting the anomaly at 720, as disclosed herein.

The component security device 150 may detect the anomaly in response to evaluating monitored behaviors of the ICSC 130. At 720, the component security device 150 may be configured to compare behaviors of the ICSC 130 to one or more thresholds, patterns, models, and/or the like. Alternatively, or in addition, the component security device 150 may be configured to characterize behavior of the ICSC 130 by use of one or more ML modules. In some implementations, the component security device 150 is configured to compare monitored behaviors of the ICSC 130 to a profile 263 of the ICSC 130. At 720, the component security device 150 may compare: power consumption of the ICSC 130 to a power profile 263A, cyber behavior of the ICSC 130 to a cyber profile 263N, functional behavior of the ICSC 130 to a functional profile 263O, operating condition(s) of the ICSC 130 to one or more operating condition profiles 263P-S, and/or the like.

In some implementations, the component security device 150 may be configured to detect the anomaly based, at least in part, on a health metric assigned to the ICSC 130 at 710. The health metric may include a combination of health metrics corresponding to respective behaviors and/or operating conditions of the ICSC 130.

At 730, the component security device 150 may be configured to implement one or more mitigation actions in response to detection of the anomaly (and/or receiving security commands 165 pertaining to the ICSC 130, as disclosed herein). The mitigation actions may include isolating the ICSC 130 from the control system 101. At 730, the component security device 150 may be configured to disconnect the ICSC 130 from power and/or communication services provided by and/or through control system infrastructure. Alternatively, or in addition, the component security device 150 may be configured to disconnect the ICSC 130 from communication services while maintaining power to the ICSC 130 (e.g., to enable interrogation of the ICSC 130). In some aspects, the mitigation actions implemented at 730 may include disconnecting first communication interface(s) 131 of the ICSC 130, e.g., 131A, while maintaining second communication interface(s) 131, e.g., 131N (blocking outbound and/or downstream communication interfaces 131 while retaining incoming and/or upstream communication interfaces 131). The mitigation actions may be implemented by the component security device 150 disposed at and/or within CIC 148 coupling the ICSC 130 to the control system 101. The component security device 150 may, therefore, be capable of isolating the ICSC 130 from the control system 101 at 730 independent the state of the ICSC 130 (e.g., regardless of whether the ICSC 130 is operational, compromised, capable of responding to system commands, and/or the like).

At 730, the component security device 150 may be further configured to couple the ICSC 130 to a forensic module 455, forensics API, recovery API, and/or the like. The mitigation actions may further include one or more failover actions. The failover actions may be configured to replace functionality implemented by the ICSC 130. At 730, computing resources of the component security device 150 may be configured to implement failover functionality, as illustrated in FIG. 5A. Alternatively, or in addition, a failover ICSC 530 may be configured to implement the failover functionality at 730, as illustrated in FIGS. 5C and/or 5D. In some implementations, the mitigation actions implemented at 730 may include switching between first and second ICSC 630A/630B, as illustrated in FIG. 5E.

Figure 8:
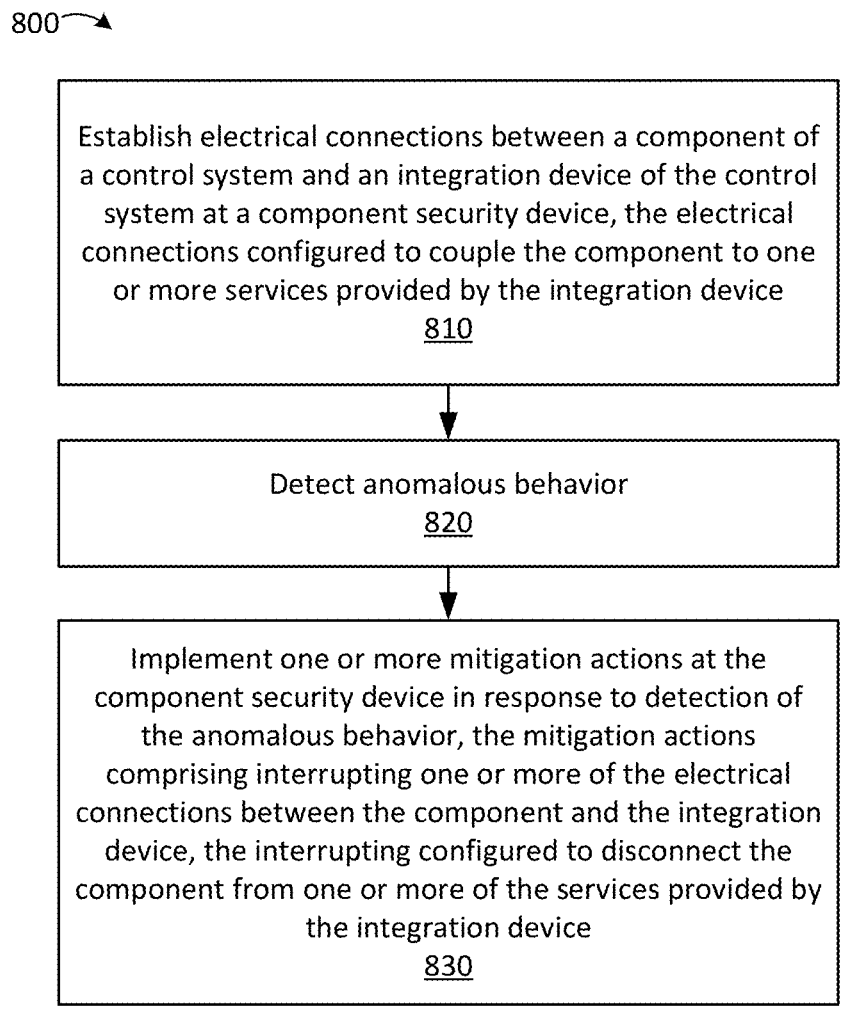
FIG. 8. illustrates a third example flow diagram depicting operations for control system security, as disclosed herein.

FIG. 8 illustrates an example of a flow diagram 800 of a method for control system security. The flow diagram 800 includes blocks 810 through 830. At 810, a component security device 150 establishes electrical connections between a component 102 of a control system 101 and an integration device of the control system 101, the electrical connections configured to couple the component 102 to one or more services provided by the integration device. The component 102 may include an ICSC 130 and the integration device may include control system infrastructure, such as an IC 146, or the like.

At 820, the component security device 150 detects anomalous behavior of the component 102. The anomalous behavior may be detected in response to monitoring the component 102, as disclosed herein. Alternatively, or in addition, the anomalous behavior may be detected in response to a security command 165 pertaining to the component 102.

At 830, the component security device 150 implements one or more mitigation actions in response to detection of the anomalous behavior at 820. The mitigation actions may include interrupting one or more of the electrical connections established between the component 102 and the integration device, the interrupting configured to disconnect the component 102 from one or more of the services provided by the integration device.

Although implementations for control system security have been described in language specific to certain features and/or methods, the subject of the appended claims is not necessarily limited to the specific features or methods described. Rather, the specific features and methods are disclosed as example implementations.

What is claimed is:

1. A security device, comprising:
 a component manager configured to establish electrical connections between a component of a control system and an integration device of the control system, the electrical connections configured to couple the component to a plurality of services provided by the integration device, the component manager comprising:
  a first coupler configured to couple with the integration device of the control system, and
  a second coupler configured to couple with the component; and
 a security engine configured to implement one or more mitigation actions at the component security device in response to detection an anomaly pertaining to the component, the mitigation actions comprising:

isolating the component from one or more of the services provided by the integration device of the control system, wherein isolating the component comprises interrupting the coupling between the integration device and the component; and providing access to forensic diagnostic data pertaining to the component while isolating the component from the one or more services provided by the integration device of the control system.

2. The security device of claim 1, further comprising:
a communication manager configured to selectively couple the component to communication services provided through the coupling between the integration device and the component;
wherein isolating the component from the control system comprises decoupling the component from the communication services.

3. The security device of claim 2, further comprising:
a power manager configured to selectively couple the component to power supplied through the coupling between the integration device and the component;
wherein isolating the component from the control system further comprises decoupling the component from power.

4. The security device of claim 1, wherein:
isolating the component from the control system comprises the component manager maintaining connections by which power is supplied to the component through the integration device while blocking one or more communication interfaces of the component; and
the security device further comprises a forensic module configured to provide access to the forensic diagnostic data pertaining to the component while the component is isolated from the one or more services provided by the integration device of the control system.

5. The security device of claim 4, wherein the forensic module is further configured to interrogate the component through the second coupler of the component manager.

6. The security device of claim 4, wherein the forensic module is further configured to provide access to diagnostic data pertaining to the component through a forensics application programming interface (API).

7. The security device of claim 4, wherein the forensic module is further configured to push configuration data to the component through a recovery application programming interface (API).

8. The security device of claim 1, further comprising processing resources configured to implement failover functionality in response to isolating the component from the control system, the failover functionality configured to replace functionality implemented by the component within the control system, the failover functionality further configured to replace one or more of: input functionality, control functionality, output functionality, input/output functionality, and communication functionality.

9. The security device of claim 1, further comprising a failover component configured to implement failover functionality corresponding to functionality implemented by the component, wherein isolating the component from the control system further comprises:
the component manager coupling the failover component to the integration device; and
the security engine configuring the failover component to implement the failover functionality corresponding to the functionality implemented by the component.

10. A method for control system security, comprising:
establishing electrical connections between a component of a control system and an integration device of the control system by a component security device, the electrical connections configured to couple the component to a plurality of services provided by the integration device; and
implementing one or more mitigation actions at the component security device in response to detection an anomaly pertaining to the component, the mitigation actions comprising:
isolating the component from one or more of the services provided by the integration device, and
providing access to forensic diagnostic data pertaining to the component while isolating the component from the one or more services provided by the integration device.

11. The method of claim 10, further comprising implementing the one or more mitigation actions at the component security device in response to receiving a security command pertaining to the component at the component security device.

12. The method of claim 10, wherein the isolating comprises disconnecting the component from one or more of: an electronic communication network, an upstream communication interface, a downstream communication interface, outbound network communication, and inbound network communication.

13. The method of claim 10, wherein the isolating comprises:
disconnecting communication couplings of the component from communication couplings of the integration device; and
maintaining a connection between the communication couplings of the component and communication couplings of the component security device.

14. The method of claim 10, wherein implementing the one or more mitigation actions further comprises:
blocking communication by the component at the component security device, while maintaining power to the component;
retrieving the forensic diagnostic data from the component through electrical connections maintained between the component security device and the component; and
providing access to the forensic diagnostic data through an electronic communication network.

15. The method of claim 14, further comprising providing access to the forensic diagnostic data by use of communication services supplied through electrical connections between the component security device and the integration device.

16. The method of claim 14, further comprising providing access to the forensic diagnostic data through a communication interface of the component security device, the communication interface configured to couple the component security device to a secondary electronic communication network, the secondary electronic communication network separate from a primary electronic communication network of the integration device.

17. The method of claim 14, further comprising providing access to the forensic diagnostic data through an application programming interface (API).

18. The method of claim 14, further comprising transferring configuration data to the component through the electrical connections maintained between the component security device and the component.

19. The method of claim 18, further comprising transferring the configuration data to the component in response to a request submitted through an application programming interface (API) of the component security device.

20. The method of claim 10, wherein implementing the one or more mitigation actions further comprises implementing failover functionality in response to isolating the component from the one or more services provided by the integration device, the failover functionality configured to replace functionality implemented by the component within the control system.

21. The method of claim 20, wherein the failover functionality comprises one or more of input functionality, control functionality, output functionality, input/output functionality, and communication functionality.

22. The method of claim 20, wherein implementing the failover functionality further comprises establishing electrical connections between a failover component and the integration device, the failover component configured to implement the failover functionality in response to being coupled to the control system through the integration device.

23. A non-transitory computer-readable storage medium comprising instructions configured to cause a processor to implement operations for control system security, the operations comprising:
   establishing electrical connections between a component of a control system and an integration device of the control system by a component security device, the electrical connections configured to couple the component to a plurality of services provided by the integration device; and
   implementing one or more mitigation actions at the component security device in response to detection an anomaly pertaining to the component, the mitigation actions comprising:
      isolating the component from one or more of the services provided by the integration device, and
      providing access to forensic diagnostic data pertaining to the component while isolating the component from the one or more services provided by the integration device.

24. The non-transitory computer-readable storage medium of claim 23, the operations further comprising implementing the one or more mitigation actions at the component security device in response to receiving a security command pertaining to the component at the component security device.

25. The non-transitory computer-readable storage medium of claim 23, wherein the isolating comprises disconnecting the component from one or more of: an electronic communication network, an upstream communication interface, a downstream communication interface, outbound network communication, and inbound network communication.

26. The non-transitory computer-readable storage medium of claim 23, wherein the isolating comprises:
   disconnecting communication couplings of the component from communication couplings of the integration device; and
   maintaining a connection between the communication couplings of the component and communication couplings of the component security device.

27. The non-transitory computer-readable storage medium of claim 23, wherein implementing the one or more mitigation actions further comprises:
   blocking communication by the component at the component security device, while maintaining power to the component;
   retrieving the diagnostic data from the component through electrical connections maintained between the component security device and the component; and
   providing access to the diagnostic data through an electronic communication network.

28. The non-transitory computer-readable storage medium of claim 23, further comprising providing access to the forensic diagnostic data by use of communication services supplied through electrical connections between the component security device and the integration device.

29. The non-transitory computer-readable storage medium of claim 28, further comprising providing access to the forensic diagnostic data through a communication interface of the component security device, the communication interface configured to couple the component security device to a secondary electronic communication network, the secondary electronic communication network separate from a primary electronic communication network of the integration device.

30. The non-transitory computer-readable storage medium of claim 28, further comprising providing access to the forensic diagnostic data through an application programming interface (API).

31. The non-transitory computer-readable storage medium of claim 28, further comprising transferring configuration data to the component through the electrical connections maintained between the component security device and the component.

32. The non-transitory computer-readable storage medium of claim 23, wherein implementing the one or more mitigation actions further comprises implementing failover functionality in response to isolating the component from the one or more services provided by the integration device, the failover functionality configured to replace functionality implemented by the component within the control system and comprising one or more of input functionality, control functionality, output functionality, input/output functionality, and communication functionality.

33. The method of claim 32, wherein implementing the failover functionality further comprises establishing electrical connections between a failover component and the integration device, the failover component configured to implement the failover functionality in response to being coupled to the control system through the integration device.

* * * * *